(12) United States Patent
Huseynov et al.

(10) Patent No.: US 12,554,860 B2
(45) Date of Patent: Feb. 17, 2026

(54) DETECTING SECURITY ISSUES IN FORKED PROJECTS

(71) Applicant: Oracle International Corporation, Redwood Shores, CA (US)

(72) Inventors: Huseyn Huseynov, Columbia, MD (US); Benjamin Roytenberg, Baltimore, MD (US); Joseph Aurelio, Columbia, MD (US)

(73) Assignee: Oracle International Corporation, Inc., Redwood Shores (CA)

( * ) Notice: Subject to any disclaimer, the term of this patent is extended or adjusted under 35 U.S.C. 154(b) by 212 days.

(21) Appl. No.: 18/420,627

(22) Filed: Jan. 23, 2024

(65) Prior Publication Data

US 2025/0238521 A1    Jul. 24, 2025

(51) Int. Cl.
*G06F 21/57*    (2013.01)

(52) U.S. Cl.
CPC ...... *G06F 21/577* (2013.01); *G06F 2221/033* (2013.01)

(58) Field of Classification Search
None
See application file for complete search history.

(56) References Cited

U.S. PATENT DOCUMENTS 5,574,898 A  *  11/1996  Leblang ............. G06F 11/3476
12,346,688 B1 *  7/2025  Cheung .................... G06F 8/71
2006/0106889 A1 *  5/2006  Mannby .............. G06F 16/1873
                                                              707/999.203
2023/0376288 A1 *  11/2023  Wengier .................... G06F 8/42
2024/0211381 A1 *  6/2024  Tsirkin .................. G06F 11/368

FOREIGN PATENT DOCUMENTS

WO    WO-03009097 A2 *  1/2003  ............... G06F 8/71

OTHER PUBLICATIONS

Docs.Kernel, "The Linux Kernel documentation," retrieved online via https://docs.kernel.org/. Accessed on May 10, 2023.
(Continued)

*Primary Examiner* — Paul R Fisher
(74) *Attorney, Agent, or Firm* — Mughal Gaudry & Franklin PC

(57) ABSTRACT

A security tool is provided to check for security issues with a progression candidate version of code. The security tool identifies a progressed version of code that addresses a documented security issue that was present in a prior version of code and has a same ancestor version of code as the progression candidate version of code. Based on a difference between the progressed version of code and the prior version of code, the security tool determines whether a similar difference has been made between other versions of code in a lineage of the progression candidate version of code. Based on determining that a similar difference has not been made, the security tool stores an indication that the progression candidate version of code is associated with the documented security issue. The security tool may also determine a proposed change to the progression candidate version of code based on the difference.

20 Claims, 7 Drawing Sheets

(56) References Cited

OTHER PUBLICATIONS

GIT-SCM, "Getting Started—What is Git?," retrieved via https://git-scm.com/book/en/v2/Getting-Started-What-is Git%3F#:~:text=The%20Git%20directory%20is%20where,a%20repository%20from%20another%20computer on Apr. 22, 2024.

Luedtke et al., "linux_kernel_cves," retrieved via https://github.com/nluedtke/linux_kernel_cves. Accessed on Jun. 14, 2023.

Wikipedia, "Approximate string matching," retrieved online via https://en.wikipedia.org/wiki/Approximate_string_matching on Apr. 22, 2024.

Wikipedia, "Common Vulnerabilities and Exposures," retrieved online via https://en.wikipedia.org/wiki/Common_Vulnerabilities_and_Exposures. Accessed on May 10, 2023.

Wikipedia, "https://en.wikipedia.org/wiki/Regular_expression," retrieved online via web on Apr. 22, 2024.

Wikipedia, "Jaro-Winkler distance," retrieved online via https://en.wikipedia.org/wiki/Jaro%E2%80%93Winkler_distance on Apr. 22, 2024.

Wikipedia, "Levenshtein distance," retrieved online via https://en.wikipedia.org/wiki/Levenshtein_distance on Apr. 22, 2024.

Y. He et al., "Automatically Identifying CVE Affected Versions with Patches and Developer Logs," in IEEE Transactions on Dependable and Secure Computing, doi: 10.1109/TDSC.2023.3264567, May 11, 2023.

Hum, Q. et al., "CoinWatch: A Clone-Based Approach For Detecting Vulnerabilities in Cryptocurrencies", 2020 IEEE International Conference on Blockchain.

Xiao, Ye et al., "Blockscope: Detecting and Investigating Propagated Vulnerabilities in Forked Blockchain Projects", arXiv:2208.00205v1, Jul. 30, 2022.

Zheng, Z. et al., "An Investigation of the Android Kernel Patch Ecosystem", Proceedings of the 30th USENIX Security Symposium, Aug. 11-13, 2021.

\* cited by examiner

DETECTING SECURITY ISSUES IN FORKED PROJECTS

BACKGROUND

Most software, such as the extensive software developed by large technology companies, is developed to meet and exceed the needs of customers. Software often operates in a diverse range of complex environments, in coordination with other software, to achieve desired functionality based on these needs. Software changes by one company may prompt software changes by another company, just to remain compatible in the same environment. As software continues to evolve, companies and customers also discover new needs. Software developers within the same company and across different companies experience similar challenges on their paths to meet and exceed these expanding needs, and these overlapping challenges prompt collaboration. Collaboration among software developers allows needs to be met more efficiently, allows solutions to be tested more thoroughly, and promotes the evolution of solutions over time as needs change.

Software developers often use existing libraries of code to start or expand the functionality of their software. There are many varieties of many different types of software that have already been developed and thoroughly tested. Redoing that work may not be practical if there is an opportunity to re-use work done by the larger software development community. Expansive libraries of software are available for download, with a variety of license limitations that come with these libraries. Many open-source licenses allow the code to be viewed, modified, and used for a variety of purposes, sometimes with little or no limitation. Large open source repositories are available on GitHub, GitLab, SourceForge, Google open source projects, Launchpad, Bitbucket, OSDN, and GNU Savannah. These repositories allow users to collaborate on software projects over long periods of time and download new versions of the software project as they are made available by their peers. Many large technology companies also have internal repositories for sharing software projects internally even if they are not open source.

Although companies can benefit from greater collaboration, their unique needs, goals, and paces of development often drive them in different directions. This divergence of needs, goals, or paces of development results in forks in the software project that are different from each other. For example, a first company may stop upgrading software at version 2.1. A second company may continue upgrading to versions 2.2 and then 2.3. A third company may stop upgrading at version 1.9 but manually add some features that were introduced in version 2.6.

Companies and developers have a difficult time coordinating with other forks if their fork of the software project contains valuable improvements or customizations that were not reflected in other forks of the software. This is particularly true if their software is already heavily integrated with other software in a manner that highly depends on features unique to their fork. A single software project may result in thousands of forks of software all advancing, sometimes minute-by-minute, in different directions, reflecting different needs, goals, or paces of development. Moreover, these forks may advance in different repositories, with spurts occurring at different times for unknown reasons, to such an extent that a software developer could not possibly follow and understand the progress being made in all versions at all times.

Despite the broad global footprint of a given software project, a company may obtain a much smaller overall benefit from using the given software project, as compared with other software projects, to support the company's product or service offerings. Even if the software project is uniquely important to the company, the company may not have a need to update the project once the project has been uniquely integrated into the company's product or service offerings. For example, if the software project involves a tool for generating a PDF document from input text, the company may never need to update or even attend to the software project after integrating the tool with their other software. The overall likelihood that new characters will be added that will significantly impact the tool may be quite small.

In the current state of software development, companies pay the most attention to software packages that have the most impact on their core products and services. If a specific version of a software package, or even the software package as a whole, does not have a known impact on the company's core products and services, that software package receives little attention from the company, to mitigate cost and development overhead by spending time and attention fixing bugs that their own customers are reporting to them. To complicate matters, even a single company may knowingly or unknowingly implement multiple different versions of the same software package, in different parts of software that may be working together.

Some software tools help companies stay up-to-date on software packages by providing information about mainstream versions of the software packages.

BRIEF SUMMARY

A security tool is provided to check for security issues with a progression candidate version of code. The security tool identifies a progressed version of code that addresses a documented security issue that was present in a prior version of code and has a same ancestor version of code as the progression candidate version of code. Based on a difference between the progressed version of code and the prior version of code, the security tool determines whether a similar difference has been made between other versions of code in a lineage of the progression candidate version of code. Based on determining that a similar difference has not been made, the security tool stores an indication that the progression candidate version of code is associated with the documented security issue. In addition, based on determining that a similar difference has been made, the security tool can also verify that the previously documented security issue has been fixed. The security tool may also determine a proposed change to the progression candidate version of code based on the difference.

The security tool may be implemented as stored instructions on one or more non-transitory computer-readable media, which, when executed, cause performance of the security checks and security issue mitigation processes described herein. The security tool may also be implemented as a local, remote, distributed, or cloud-based computer system for performing the security checks and security issue mitigation processes described herein. The security tool may also be described in terms of the computer-implemented method or process that occurs to check for security issues and mitigate security issues, as described herein.

In one embodiment, a computer-implemented method includes identifying a progressed version of code that (a) has an ancestor version of code that is also an ancestor of a progression candidate version of code, and (b) modifies a prior version of code to address a documented security issue that existed in the prior version of code. In various embodiments, the prior version of code, the progressed version of code, the progression candidate version of code, and/or the ancestor version of code are each different from each other.

The computer-implemented method includes identifying a target difference between the progressed version of code and the prior version of code. Identifying the target difference may include identifying a progression change to at least one line of code between the prior version of code and the progressed version of code. The progression change includes one or more of an addition, removal, or partial modification of the at least one line of code between the prior version of code and the progressed version of code.

The computer-implemented method also identifies one or more other differences between two or more other versions of code in a lineage of the progression candidate version of code. A determination may then be made on whether the documented security issue has been addressed in the progression candidate version of code by comparing the target difference to the one or more other differences. Based at least in part on determining that the documented security issue has not been addressed in the progression candidate version of code, the computer-implemented method stores an indication that the progression candidate version of code is associated with the documented security issue.

In one embodiment, the computer-implemented method determines that the documented security issue has not been addressed in the progression candidate version of code based on a distance between the target difference and a particular difference of the one or more other differences. In this embodiment, the computer-implemented method includes determining the distance between the target difference and a particular difference of the one or more other differences. The distance may be a number of character edits needed to transform the target difference to the particular difference.

The computer-implemented method may identify one or more other differences between two or more other versions of code in the lineage of the progression candidate code at least in part by storing information identifying a path from the ancestor version of code to the progression candidate version of code, determining that a first prior version of code was changed to a second prior version of code along the code path, and identifying a particular difference between the first prior version of code and the second prior version of code.

The computer-implemented method may receive a request to analyze the progression candidate version of code and perform the step of identifying the progressed version of code that addresses the documented security issue in response to the request. The computer-implemented method may also report a set of security issues in response to the request. In this embodiment, the method may further include adding, to a set of security issues for the progression candidate version of code, the indication that the progression candidate version of code is associated with the documented security issue. One or more other security issues of the set of security issues may be based at least in part on a static code analysis of the progression candidate version of code. The static code analysis identifies a vulnerability in how the progression candidate version of code is written without using any documented security issues for a same code family as the progression candidate version of code.

In various embodiments, information about security issues may be pulled from sites that have information about security issues and/or code projects. In one embodiment, the computer-implemented method includes parsing a site where information is posted about security issues relating to code projects. The code projects include a particular project having a same code family as the progression candidate version of code. Based at least in part on the site, the computer-implemented method may detect an association between a proposed fix to the documented security issue and the progressed version of code.

The difference files may be broken up into sections, some of which may relate to the documented security issues and others of which may not. In one embodiment, the prior version of code includes a plurality of logically distinct sections. At least a first section and a second section may have been changed between the prior version of code and the progressed version of code. The computer-implemented method further includes determining, based on metadata about the documented security issue, that the documented security issue arose from at least the first section of the plurality of logically distinct sections and not from at least the second section of the plurality of logically distinct sections. The computer-implemented method may proceed to identify the target difference between the progressed version of code and the prior version of code at least in part by omitting any changes that were made to said at least the second section of the plurality of logically distinct sections and including one or more changes that were made to said at least the first section of the plurality of logically distinct sections.

In the same or a different embodiment, sections may also be omitted from consideration when determining the differences between the two or more other versions of code. In one embodiment, the two or more other versions of code comprise a plurality of logically distinct sections. At least a first section and a second section were changed between a first version of code of the two or more other versions of code and a second version of code of the two or more other versions of code. The computer-implemented method further includes determining that the documented security issue arose from at least the first section of the plurality of logically distinct sections and not from at least the second section of the plurality of logically distinct sections. In this embodiment, the computer-implemented method may identify the one or more other differences between the two or more other versions of code in the lineage of the progression candidate version of code at least in part by omitting any changes that were made to said at least the second section of the plurality of logically distinct sections and including one or more changes that were made to said at least the first section of the plurality of logically distinct sections.

In various embodiments, the computer-implemented method supports subscribing to newly detected security issues for the progression candidate version of code. In one example, the computer-implemented method accesses a set of documented security issues in a same code family as the progression candidate version of code. The set of documented security issues may grow over time. The method further includes, for an entity associated with the progression candidate version of code, subscribing to any security issues of the growing set of documented security issues in the same code family as the progression candidate version of code. The step of identifying the progressed version of code that addresses the documented security issue may be performed based at least in part on said subscribing to any security issues of the growing set of documented security issues in the same code family as the progression candidate version of code.

The computer-implemented method may also include various processes for automatically proposing a change to the progression candidate version of code. In one embodiment, the computer-implemented method determines that the target difference occurs between a prior part of the prior version of code and a particular part of the progressed version of code. The computer-implemented method may then identify a corresponding part of the progression candidate version of code that corresponds to the prior part of the prior version of code. The method may further include determining that the target difference is compatible with the corresponding part of the progression candidate version of code, and, if so, storing the target difference as a proposed change to the progression candidate version of code. The proposed change, if applied, may be predicted to fix the documented security issue.

In various aspects, a system is provided that includes one or more storage repositories that store data, one or more processors that process data and instructions, and a non-transitory computer-readable storage medium that stores instructions which, when executed by the system, cause the system to perform part or all of one or more methods disclosed herein.

In various aspects, a computer-program product is provided that is tangibly embodied in a non-transitory machine-readable storage medium and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

DETAILED DESCRIPTION

Figure 1:
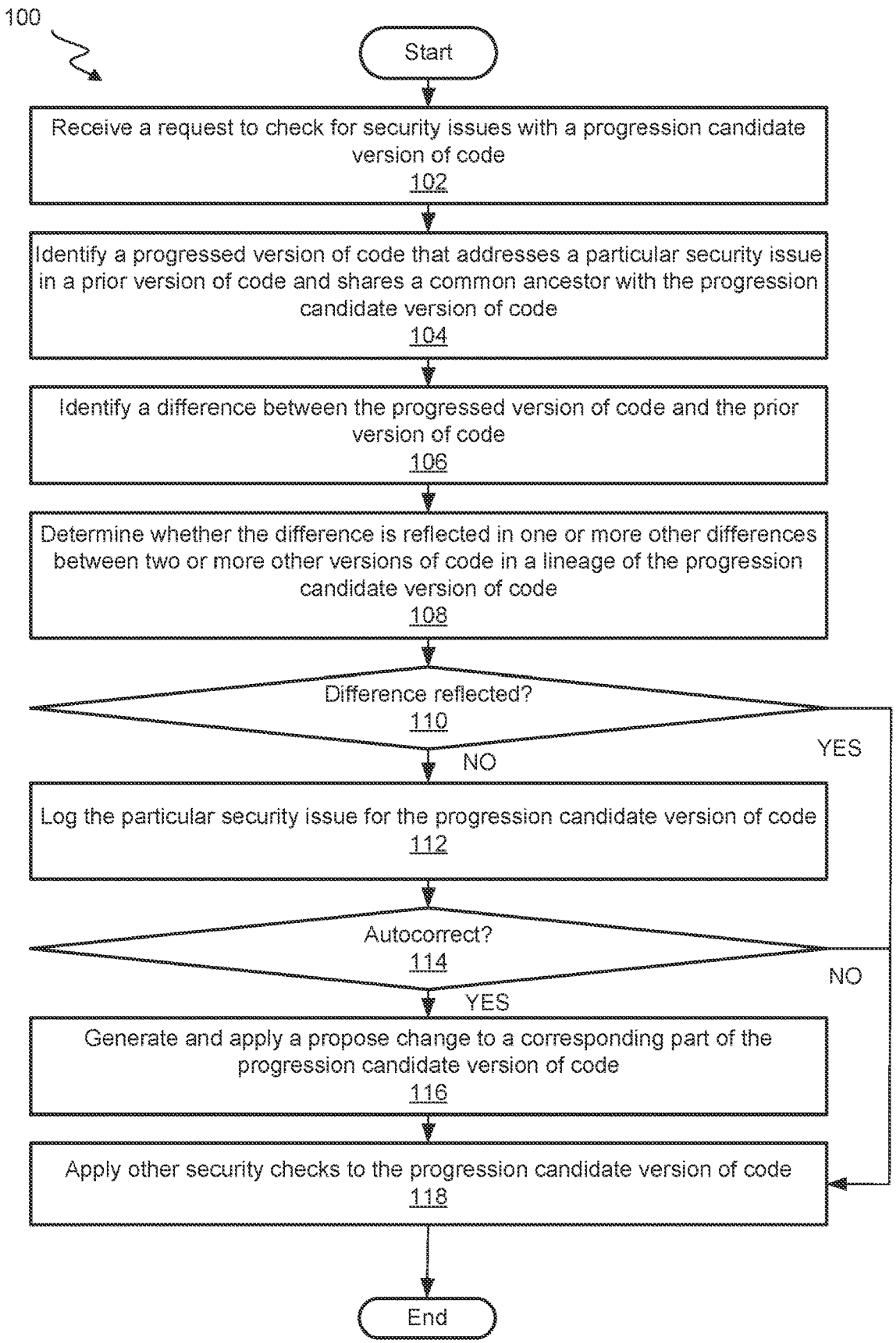
FIG. 1 is a flow diagram depicting a process for checking for security issues with a progression candidate version of code.

A security tool checks for security issues with a progression candidate version of code by determining whether a lineage of the progression candidate version of code reflects a difference made by a security patch between a prior version of code and a progressed version of code, using a variety of techniques described herein. The security patch is known to address a documented security issue. If the lineage of the progression candidate version of code does not reflect the difference made by the security patch, the security tool may store an indication that the progression candidate version of code has the documented security issue. The security tool may also propose a change to the progression candidate version of code to address the documented security issue.

The security tool is described as a software-based tool that runs on different variations of computer system hardware, including local computer system hardware or hardware that supports a cloud-based infrastructure. The security tool implements processes to check for code security and log or remedy insecure code. The security tool may be stored on one or more non-transitory computer-readable media for causing the computer system hardware to implement the processes described.

As used herein, a "security issue" refers to any documented or otherwise logged occurrence of a software vulnerability or exposure that impacts the version of code. A security issue introduced by a particular version of code may impact other code that interact with the particular version of code. A security issue for a particular version of code may also impact other versions of code that include the same weaknesses that led to the documented vulnerability even if the vulnerability has not yet been documented for the other versions of code. In this scenario, the other versions of code are said to have the "security issue" once these same weaknesses are discovered since they have the code ingredients to reproduce the security issue even if the security issue is not yet documented against the other versions of code. There are many different known security issues that may or may not have been addressed in various code bases. These known security issues may include, for example, security issues that are posted in the US National Vulnerability Database as Common Vulnerabilities and Exposures (CVEs), as well as in other locations such as from MITRE or RedHat.

Some security issues have been identified in patches or other changes to open-source code versions, such that the open-source code implementers may choose to upgrade to a patched version of the open-source code to avoid the security issues. In many scenarios, security issues are present in open-source code even though there is no clear documentation that such security issues exist, either because the issues themselves have yet to be discovered or because the documented security issues were not known to be applicable to the particular versions of open-source code being developed by an entity. For example, security issues may be discovered along a main trunk or specific forks of a code project, and an entity may implement code along a different fork of the code project.

Subscribing to Security Review

FIG. 1 shows a security review process 100 for checking for security issues with a progression candidate version of code. Security review process 100 begins with step 102, where a request is received to check for security issues with a progression candidate version of code. Based on the request, the security tool may discover a variety of security issues with the progression candidate version of code, and optionally may provide one or more proposed changes to improve the progression candidate version of code based on the security issues discovered.

Figure 2:
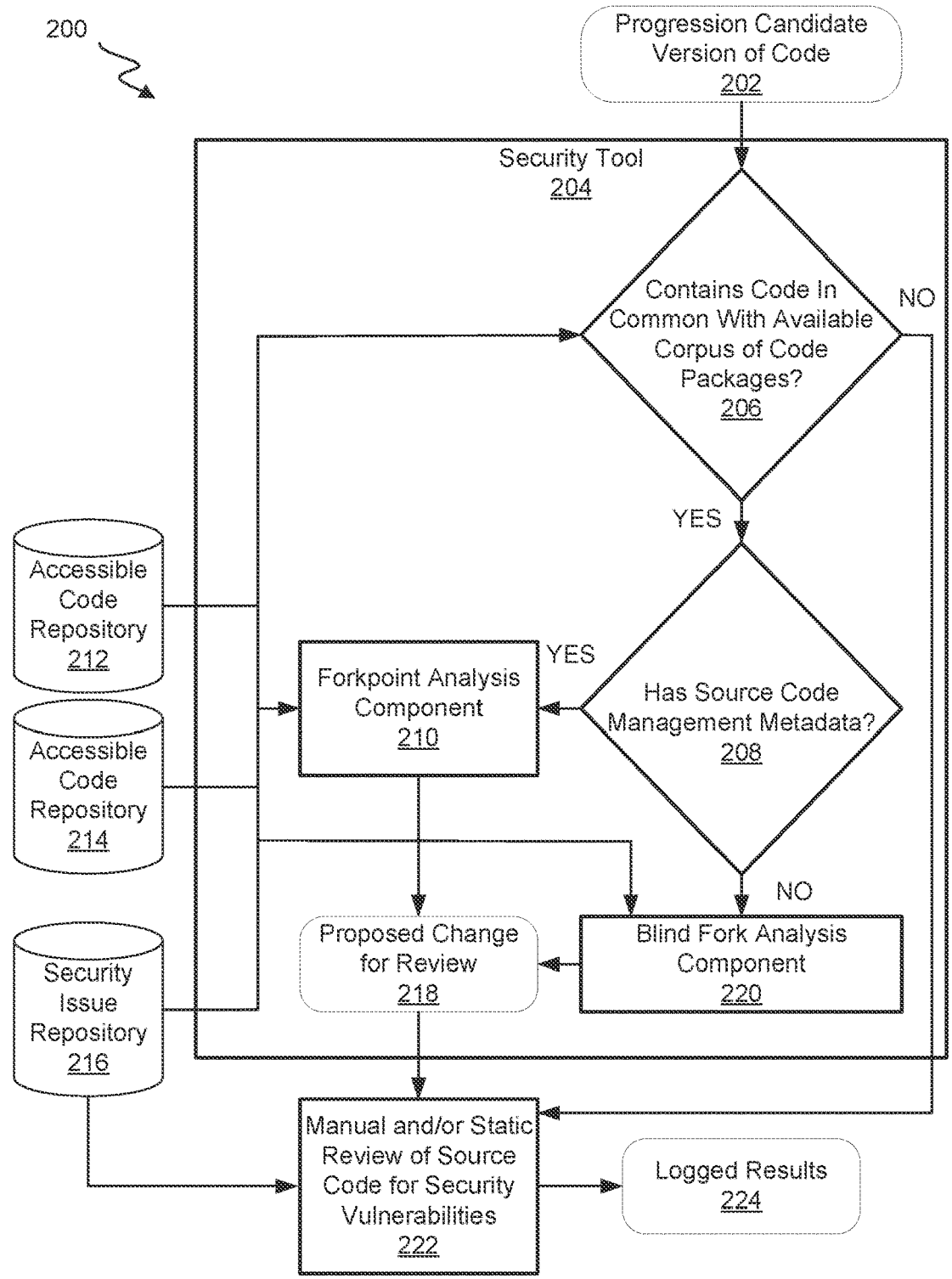
FIG. 2 is a diagram of a security tool for detecting security issues in a progression candidate version of code.

FIG. 2 shows a system 200 including a security tool 204 for detecting security issues in a progression candidate version of code 202. Security tool 204 receives, as input, progression candidate version of code 202 or an identifier or reference thereto. Security tool 204 may access progression candidate version of code as well as other versions of code in a same code family as the progression candidate version of code to determine whether there are any security issues with the progression candidate version of code.

A security review process begins by identifying the version of code or various versions of the same or various code projects that should be reviewed. Different code projects originate from different root versions of code that are then modified in versions as the code project continues. The version(s) of code may be identified as part of a process for subscribing to security issues that may arise now or in the future for the identified version(s) of code. In this example, the subscribing entity may be a company that owns the identified version(s) of code, a partner of that company, or a user responsible for or otherwise interested in security of the identified versions of code. The security tool may periodically operate to check for security issues in a same code family as the identified version(s) of code, and provide notification(s) to the subscribing entity when security issues are found in a growing set of security issues. These notifications may allow the subscribing entity to fix the issue automatically or manually, modify a fix prior to implementing the fix automatically or manually, add the issue to a security report, or reject the issue as a non-issue.

Alternatively, the version(s) of code may be identified as part of a one-time or transactional security check for the version(s) of code, for example, due to a code audit. Code audits may be required or otherwise employed in various scenarios before code is integrated with other code, or before code is allowed to access interfaces or otherwise interoperate with other code. There are also a number of ways a code audit may be employed based on suspicion from any number of sources that a vulnerability is being exploited or data has been exfiltrated. Code audits may be required or otherwise employed when a suspected defect is occurring from the version(s) of code, but the suspected defect cannot readily be pinpointed or verified. Security defect or vulnerabilities may be suspected, for example, when a vulnerability has been exploited or data has been exfiltrated from a system that runs the version(s) of code.

Regardless of the reasons for identifying one or more software versions to the security tool, these one or more software versions may be used by the security tool in a security review process that finds known security issues that have not yet been addressed in the one or more software versions. Because the security tool is looking for security issues that have not yet been addressed in these input version(s) of code, the input version(s) of code are referred to herein as the progression candidate version or versions of code. In other words, there is a possible opportunity for the code to progress by addressing new security issues. FIGS. 1, 2, 3A, and 3B track various aspects of security review functionality as the security tool reviews a single progression candidate version of code. Additional progression candidate versions of code may be similarly reviewed, yielding additional security benefits in the event that multiple security issues are found and potentially fixed or otherwise mitigated.

Various embodiments described herein use information not just from the progression candidate version of code, but also from prior versions of code in a same lineage or version commit history as the progression candidate version of code. The lineage of the progression candidate version of code includes all ancestor versions of code on a path of commits to the progression candidate version of code or all ancestor versions of code reflecting significant or substantive code changes. The first ancestor node on the path may be called the root node, and the progression candidate version of code may have other ancestor nodes along the main trunk of progression for the code project. For example, the progression candidate version of code may have resulted from 1000 consecutive commits that occurred between an ancestor version of code that represents a fork point and the progression candidate version of code. The fork point may be a version on the main trunk just before a first forked version forked away from the main trunk towards the progression candidate version of code. The ancestor version of code may be on the main trunk of a software development project even though the progression candidate version of code may be on a fork of the software development project. The 1000 consecutive commits in the example represent 1000 consecutive versions between the ancestor version of code and the progression candidate version of code, all of which are in the lineage of the progression candidate version of code.

Each commit between each version of the consecutive versions between the ancestor version of code and the progression candidate version of code represents an incremental change that occurred ultimately to change functionality or formatting of the progression candidate version of code. The changes that occurred between the consecutive versions in the lineage of the progression candidate version of code may be referred to herein as "patches" or "differences" effected by each of these different consecutive versions. The patches or differences refer to the changes themselves that were made from version to version, and these changes may be made for a variety of reasons, most of which likely relate to code functionality and few of which likely relate to fixing security issues.

For a given ancestor version of code, all versions of code that branch or descend from the ancestor version of code, including the main trunk and all forks that occur after the ancestor version of code, are referred to herein as being in the same code family. Code in the same code family may be useful for analyzing security issues even if the code exists along a different fork or path away from the ancestor version of code. If the ancestor version of code has no prior versions of code, the ancestor version of code may be referred to herein as the root version of code. If two versions of code have different root versions of code, the two versions of code are referred to herein as not being in the same family.

Detecting a Relevant Security Fix

As shown in FIG. 1, security review process 100 proceeds to step 104, where a progressed version of code is identified such that the progressed version of code (a) addresses a particular security issue in a prior version of code, and (b) shares a common ancestor with the progression candidate version of code. For example, the progressed version of code may be a patch to an open source project that modifies a prior version of code by committing changes to the prior version of code that fix a security issue. The progressed version of code may be a CVE reference patch for a given code project that is explicitly identified as part of the CVE or other security issue listing, a patch to the code project that matches criteria specified in the CVE or other security issue listing, or another patch to the code project that has otherwise been flagged as addressing the CVE or other security issue.

The security tool may find the CVE reference patches by supplying a path to the open source project and a date range, such as a year, to a CVE finder tool that collects CVEs for open source projects by year. The CVE finder tool identifies all CVEs known for a main trunk of the open source project in the given timeframe and downloads a difference file (CVE patch or other security-prompted change) for each identified CVE for further analysis. The difference file indicates what changes the CVE patch made to fix the security issue. The difference file may be compared with differences made by the patch commits of the versions descending from the ancestor version to determine if any of the patch commits apply the same changes (and optionally other changes as well). If so, the patch commit that applies the same changes as the CVE reference patch is identified as the change that results in the progressed version of code.

In the example below, the CVE finder tool accepts a path to the open source project, the Linux kernel for example, and 2023 as input, and outputs the following example snippet of CVEs that can be checked against the versions in the code project to see if they have been fixed. Such information may be provided in a structured document such as a JSON file.

```
...
"CVE-2023-22999": {
  "5.15": {
    "cmt_id":
      "5157828d3975768b53a51cdf569203b9531
      84022",
    "fixed_version": "5.15.17"
  },
  "5.16": {
    "cmt_id":
      "d0ed1113ba26a515af47847cceb3618e8483595a",
    "fixed_version": "5.16.3"
  }
},
"CVE-2023-23001": {
  "5.15": {
    "cmt_id":
      "0dc4db8abccf266390b81b72064191f876e55
      876",
    "fixed_version": "5.15.17"
  },
  "5.16": {
    "cmt_id":
      "c994dbcc58d6d09c0f736dfbf9f5d6a62d26bd5a",
    "fixed_version": "5.16.3"
  }
},
"CVE-2023-23002": {
  "5.10": {
    "cmt_id":
      "4579954bf4cc0bdfc4a42c88bl6fe596fle7f82d",
    "fixed_version": "5.10.94"
  },
...
```

In the example, each of these fixes may be analyzed to see if the fix is present in a version that descends from an ancestor of the progression candidate version of code. The security tool may generate or download a difference patch for each of the CVEs, as a reference patch, to use for determining if the difference has been made in a version that descends from an ancestor of the progression candidate version of code. In another embodiment, the fix itself may already be known to descend from the ancestor of the progression candidate version of code.

In one embodiment, the difference file has valuable information starting from the path to the open source project, and/or names of affected functions and lines being added (marked as "+") or removed ("−"). Difference files may also be determined for each of the patch commits that descend from the ancestor node. Based on those markers of additions, modifications, or removals being the same or similar, the security tool may determine that the CVE patch matches a patch commit that descends from the ancestor version, and the result of the patch commit is determined to be the progressed version of code that implements the security fix.

In various examples and embodiments described herein, security vulnerabilities may be recorded and retrieved as Common Vulnerabilities and Exposures (CVEs) or as other security vulnerabilities that are recorded and retrieved without a CVE. Although CVEs provide a formal and way of reporting security vulnerabilities, other security vulnerabilities may be reported in less formal ways, such as in other lists or sets of vulnerabilities, security-intensive blogs, bug tracking systems, and via other tools, workflows, and data sets for tracking security issues. In some examples, security vulnerabilities may be reported externally to a formal CVE issue tracking process or to another external issue tracking process and patched by the software maintainers. In other examples, the maintainers may discover a vulnerability internally and patch the vulnerability without reporting the issue to an external issue tracking process. Additional information about vulnerabilities present or patched, leading to a stored set of security issues for analysis, can be found in: 1) the source code management metadata; 2) the "bug tracker" associated with a source code project. (e.g. on a Github project, for example, in the Issues tab.); 3) On the "patch notes", "changelog", or other published listing of the software that is typically included in a software release; 4) external sources reporting on issues such as when the exact technical details are still under embargo to provide time for organizations to update. In some examples, the existence of a vulnerability may be immediately reported, but the technical details or exact patch may be hidden or obscured. A skilled developer familiar with the affected component and knowledge of the fixed version could locate the open source patch and add the patch manually to a set of issues for analysis. Additionally or alternatively, issue source pathways, rules for parsing the issue sources and extracting new issues from the different sources at the different source pathways, as well as determining the differences represented by fixes for these extracted issues, may be mapped to an automated or semi-automated set of growing issues.

In some embodiments, the set of security issues does not include some existing CVEs that are irrelevant to security issues being tracked, and the set of known CVEs does not include some existing security issues that are documented outside of the formal CVE tracking process. Some, all, or none of the security issues may be mapped to CVEs that have been remediated. Various examples provided herein make reference to CVEs and security issues, and any example that references a CVE may also or alternatively utilize a security issue tracked outside of the CVE process. Any example that references a security issue may utilize a security issue discovered inside or outside of the CVE process.

The example of FIG. 2 includes two decision boxes inside security tool 204, each of which is checked before proceeding to detect a relevant security fix. In a first box 206, a check is made on whether progression candidate version of code 202 contains code in common with an available corpus of code packages. For example, is the progression candidate version of code open-source code or another type of code where the source code and sometimes metadata about version changes is available in one of accessible code repositories 212 or 214. For example, such metadata may be available from GitHub, GitLab, SourceForge, Google open source projects, Launchpad, Bitbucket, OSDN, and GNU Savannah, or any other code change management tool. If the progression candidate version of code is a type of code where source code is available in accessible code repositories 212 or 214, flow continues to decision 208 where security tool 204 determines whether source code management metadata is available for code in the same family as progression candidate version of code 202.

If source code management metadata is available, control passes to fork point analysis component 210 of security tool 204, which detects a relevant security fix using source code metadata available from accessible code repository 212 and/or 214 and optionally source code from the accessible code repository 212 and/or 214, as well as known security issues from security issue repository 216. In particular, fork point analysis component 210 may take advantage of version path information that is already stored in accessible code repository 212 and/or 214 for different versions. The version path information for a given version indicates a path from the given version back to a root version of code or ancestor version of code, or first or otherwise prominent distributed version, of the software development project. This version path information allows the fork point analysis component to efficiently skip versions of the code project that have already been patched with known security issues on a main trunk of the code project prior to the fork point. The version path information also allows the fork point analysis tool to skip versions of the software project that forked off of the main trunk well before the fork point and are less likely to have enough code overlap or similarity to the progression candidate version of code 202 to be helpful.

The fork point analysis component may skip to analyzing those versions or even just metadata of those versions that are most likely to have code overlap with progression candidate version of code 202, occurring after the fork point and optionally along a main trunk of the code project. In another example, the fork point analysis component looks for security issues within N distance from the main trunk of the code project or M distance from the forked trunk of the code project in the direction of the progression candidate version of code, where N and M are the number of version changes or the number of character or line changes away from the main trunk or forked trunk of the code project. In some examples, the forked trunk includes many forks, and those forks also have forks. Each of these forks has a unique lineage back to an ancestor version of code that might be shared by all or some of the forks.

In one embodiment, the differences between versions are precomputed and stored in source code management metadata in accessible code repository 212 and/or 214. The differences between versions may be used directly in determining whether any of the differences are similar to a known security patch, such as a reference security patch for a CVE. The differences between versions may also be used to determine whether a difference known to be made by a security patch is similar to or different than a difference made between two versions in a lineage of the progression candidate version of code. Additionally, comparing the differences between versions or commits to the difference represented by the security patch leads to speedups in computation due to constraining the search space to the parts of the code that changed rather than to the entire code project, regardless if iterating commit-by-commit, in one embodiment, or analyzing a condensed difference across multiple commits in another embodiment.

If source code management metadata is not available, control passes to blind fork analysis component 220 of security tool 204, which detects a relevant security fix using source code from accessible code repository 212 and/or 214, and using known security issues from security issue repository 216, but without having precomputed metadata about the source code versions from accessible code repository 212 and/or 214. In one embodiment, the blind fork analysis component 220 may analyze more source code versions than the fork point analysis component 210 would analyze in a similar scenario because the blind fork analysis component does not have the information to efficiently filter out those changes and versions that do not branch back to the common fork point, or those changes that occurred prior to the fork point.

Blind fork analysis component 220 may reconstruct, to the extent possible, version histories between versions in the code repository 212 and/or 214. This may be done based on hash-guided commit history tracing, commit dates, and/or forensic heuristics. In one example, missing information about version history can be supplemented to code repository 212 and/or 214 based on a search on the web for published code versions with significant or complete overlap with the code versions that have missing information. Version history for the most overlapping version found on the web may be combined with the missing version history of the searched version to begin assembling a version history for the versions under analysis. In example, based on a commit date or time of a version identified by hash, what overlap the code version has with other code versions, and how the versions of code evolve over time, blind fork analysis component may, to the extent possible, reconstruct a version history that traces the progression candidate version of code back to an ancestor fork point, as well as tracing other versions of code such as a progressed version of code back to the same ancestor fork point.

In one embodiment, hash-guided commit tracing includes determining and storing hashes of certain files as anchor points, and then iterating backwards in history to see when these hashes appear simultaneously in a certain commit version to make a best-effort guess of the fork point. In the same or a different embodiment, commit dates (namely, the very first commit in the progression candidate version) can be used to approximate a possible fork point, since usually the initial commit is made not long after importing the code from the upstream (which tends to be pointing to the most recent version, at the time). In the same or a different embodiment, forensic heuristics can use comments in code files or even non-code files (eg. CHANGELOG, LICENSE, README), to determine the version at which the code project was forked.

In some examples, a fork point identification application (for example, implemented in Python) analyzes Git history of given open-source application to identify fork history, for example, based on explicit metadata or based on implicit cues such as hash-guided commit history tracing and/or other cues mentioned above.

In one embodiment, whether in blind fork mode or fork point analysis mode, when searching for a relevant security issue, the security tool may, before a deeper security issue analysis, filter out versions of code that are not within a threshold distance or a high enough similarity score to the progression candidate version of code. For example, another version of code may be so different from the progression candidate version of code that only 50% of the other version's code lines are present in the progression candidate version of code.

In another example, k-means clustering or another clustering technique may be applied to the available versions of code, filtering out clusters whose representative version of code is not within a threshold distance of the progression candidate version of code. In a first round of clustering and filtering, several clusters representing thousands of versions of code may be filtered out because, even if a security issue were present, the versions are too dissimilar from the progression candidate version of code. In a second round of clustering and filtering, only a few clusters representing relatively few versions of code may be filtered out, as the remaining clusters are more similar to the progression candidate version of code. This process may be iteratively performed until, in a later round of clustering, all clusters match the progression candidate version of code within the threshold.

In yet another example, the progression candidate version of code may be broken up into chunks to be analyzed separately, where other versions of code for analysis are filtered that are dissimilar to or have no chunk that is similar to the chunk under analysis. In this example, similar filtering techniques could be applied as described above but with respect to the chunk rather than to the entire progression candidate version of code.

Regardless of whether and how the versions for analysis are filtered down, based on fork point analysis, overall similarity, and/or chunk similarity, the security tool analyzes the remaining versions to see if any of the versions have any known security issues that have been fixed. In one embodiment, the security tool steps through a set of known security issues potentially impacting the software project. For each security issue, the security tool may find, either from the security issue itself from security issue repository 216 or from version metadata in accessible code repository 212 or 214, an explicit indication that one of the versions for analysis has been patched to fix a security issue. Alternatively, the security tool may find an implicit indication that one or more versions for analysis have been changed in a way that is similar to the changes needed to fix the security issue even if the security issue is not mentioned in relation to the one or more versions.

In one embodiment, a progressed version of code may be found that results from a change that is similar to a reference security patch from security issue repository 216, even if the reference security patch is not otherwise along a main trunk of progression for the software project under analysis. The change between the progressed version of code and a prior version of code may be precomputed or determined as part of the fork point or blind fork analysis. The similarity between the progressed version of code and the reference security patch may be determined, for example, based on whether a distance between the reference security patch and the progressed version of code's patch is below a threshold. In one example, the distance may be the minimum number of characters that would be changed if the reference security patch were transformed into the progressed version of code's patch. In another example, the distance may be the minimum number of words that would be changed if the reference security patch were transformed into the progressed version of code's patch. In various examples, certain variables, commands, syntax, object references, references to structures, or references to other logical resources may be excluded from the distance comparison, or may be counted as a fixed number (e.g., 1 or 2) of characters or words of difference, to ensure that a long object name difference does not necessarily lead to a large difference if all other factors are the same between the code changes.

In a particular embodiment, the distance between the progressed version of code's patch and the reference security patch is determined using the Levenshtein algorithm for computing the Levenshtein distance between the patches. Assuming neither patch is empty, the Levenshtein distance between the patches is computed by preserving the largest possible substrings that are in common between the two patches as unchanged, and providing insertions and deletions to accommodate the smaller substrings that are not in common between the two patches. This results in the minimum number of changes between two strings represented by the two patches.

In one embodiment, the distance may be determined in absolute terms. In another embodiment, the distance is determined based on a percentage of total character differences between the reference security patch and a patch in a same code family as the progression candidate version (such as the progressed version's patch). For example, in order to count as a match, a distance analyzer may require a very small or even identical distance between a small reference security patch and another patch in the same code family as the progression candidate version. By using the percentage of overall difference, a relatively larger reference security patch may be counted as a match with a larger distance between the larger reference security patch and another patch in the same code family as the progression candidate version.

In one embodiment, the distance is determined by focusing on a section, function, or class in which the security fix occurred, while omitting changes that occurred to other sections, functions, or classes. These omissions of irrelevant sections may be made for both the reference security patch as well as the patch in the same code family as the progression candidate version.

In one embodiment, the distance analyzer uses regular expressions to match text that can be safely ignored in the distance comparison. For example, commenting text and text that has no impact on code output may be ignored in the distance comparison between different sets of text. In another embodiment, the distance analyzer uses regular expressions to map some expressions to semantically equivalent other expressions, so the distance between such expressions will end up as zero even if such expressions were represented differently in different files.

In one embodiment, a distance analyzer ignores some syntax that is known not to impact the semantic meaning of the code. For example, the distance analyzer may consider "+int i; +i=0;", adding two code lines corresponding to "int i" and "i=0," to be semantically equivalent to "+int i=0;", adding one code line "int i=0;", even though, technically, these strings are different by at least three characters: "; i" (semicolon, space or return, and i). As another example, distance analyzer may consider:

"+int i=0;
+while (i<5) {
+//work
+i++;
+}"

to be semantically equivalent to:

"+int i;

```
+for (i=0; i<5; i++) {
+//work
+}"
```
with similar additional code injected as/work, even though, technically, these strings are different by at least 27 characters, as shown below.

```
int i=0; (4 characters)
while (i<5) {(19 characters)
//work
i++;(4 characters)
}
```

By treating these semantically equivalent strings as the same, the distance analyzer may be able to identify the reference patch as occurring in the progressed version of code even though the progressed version of code is not identical to the reference patch.

In one embodiment, the distance is determined between added or removed lines of code reflected in the reference patch and added or removed lines of code in a patch represented by the progressed version of code, even though the difference file itself may contain additional information.

In one embodiment, the progressed version of code may be separately labeled with metadata that the progressed version of code addresses a particular security issue. In this embodiment, the progressed version of code may be found as code that addresses the particular security issue regardless of whether the particular security issue has a reference patch and regardless of whether the progressed version of code matches the reference patch.

In a specific example, the progression candidate version of code is a customized version of the Linux kernel. The Linux kernel is one of the largest and most active free software projects that has roughly 8 million lines of code and over 1000 contributors to each release. As a result, attempting to identify the presence of CVEs or check for a patch of any particular CVE might not be practically possible without using the security tool described herein. The customized kernel code may be traced up an ancestry tree to determine a fork point or ancestor version from a main trunk of the Linux kernel. A CVE may be mentioned in reference to a version descending from the ancestor version even though the CVE is not mentioned in relation to the customized version of the Linux kernel. In another embodiment, a CVE is not mentioned in a code repository containing a family of Linux kernel versions including the ancestor version and the customized version, but the presence of a CVE or other security issue may be validated by searching for the CVE or other security issue in multiple online sources that reference the Linux kernel, by parsing each patch commit to determine whether the patch commit fixes known security issues, and/or based on a previously curated list of security issues for the Linux kernel.

For the customized version of the Linux kernel, the security tool determines whether the customized version of the Linux kernel has been forked and differs from the main trunk of development. If a fork is detected, the security tool identifies a fork point or ancestor version from a main trunk of the Linux kernel. Then, descendant versions after the ancestor version are analyzed for patches addressing CVEs. In one embodiment, even if the descendant versions do not mention a security issue or CVE directly, the security tool may identify a security issue for a set of known CVEs that may be relevant to the Linux kernel generally by comparing, for each CVE, a reference patch of the CVE to the patch commits of the descendant versions. If there is a match, the patch commit may be labeled by the security tool as fixing the security issue in a progressed version, and a prior version before the patch was committed may be labeled by the security tool as having the security issue.

Identifying Changes Made by the Security Fix

Once a progressed version of code has been identified, process 100 of FIG. 1 continues in step 106 to identify a difference between the progressed version of code and the prior version of code. This difference may already be stored in a difference file associated with the progressed version of code, or the difference may be computed anew by comparing the progressed version of code to an immediately preceding or prior version of code to determine what lines have been added, removed, or otherwise modified to result in the progressed version of code. In one embodiment, this difference file has already been used to find the progressed version of code. In another embodiment, the progressed version of code was separately marked as addressing the security issue, and the difference file is computed anew. In either scenario, the difference is identified for further analysis.

FIG. 2 shows fork point analysis component 210 and blind fork analysis component 220 for finding accessible code that has a security fix and descends from code that has a code overlap with progression candidate version of code 202. Once the code is found, the changes made by the security fix are identified in a difference file.

The difference file may indicate additions, deletions, and/or modifications to the source code (for example, source code of the version prior to the security fix) with a focus on the part(s) of the source code that changed and how those parts changed. The difference file may omit parts of the source code that were unchanged, to provide a better focus on the changed parts.

An example difference file is shown below, which indicates that the security patch removed a package "a/block/bio.c" and added a package "b/block/bio.c", as well as removed a line "page=alloc_page(q->bounce_gfp|gfp_mask);" and added a line "page=alloc_page(q->bounce_gfp|_GFP_ZERO| gfp_mask);".

```
diff -git a/block/bio.c b/block/bio.c
index 1c52d0196e15c6 . . . 40004a3631a803 100644
--- a/block/bio.c
+++ b/block/bio.c
@@ -1627,7 +1627,7 @@ struct bio*bio_copy_kern
   (struct request_queue*q, void*data, unsigned int len,
   if (bytes>len)
      bytes=len;
- page=alloc_page(q->bounce_gfp|gfp_mask);
+page=alloc_page(q->bounce_gfp|_GFP_ZERO|
   gfp_mask);
   if (!page)
      goto cleanup;
```

Difference files like the one above may be stored as a reference patch for a corresponding CVE or as metadata about changes made by the progression candidate version of code. The difference files may be generated anew by comparing a patched version of code to a version of code immediately before the patch to determine the packages and lines changed as shown, with added lines marked as + and deleted lines marked as –.

In one embodiment, the security tool periodically maintains data from known projects such as known open-source projects so the CVEs, and their corresponding difference files do not need to be regenerated each time. For example, the security tool may track data for the Linux kernel CVEs and contain an aggregated list of kernel CVEs along with their patch commits and other metadata about the kernel CVEs. The data may be actively maintained, and the list of CVEs periodically updated to reflect the most recent discoveries. In another embodiment, the security tool includes a web crawler to collect data from multiple sources (NVD, Mitre, RedHat) and generate the list of CVEs or other security issues anew or partially anew to be verified against a code family of the progression candidate version of code. This code family includes the progressed version of code, which descends from a common ancestor as the progression candidate version of code.

Referring back to the customized Linux kernel example, the security tool finds a patch that matches up semantically with the reference patch for a given CVE and labels the patch commit as the change that resulted in the progressed version and modified a prior version at or after the fork point. The fork point may be indicated by a common ancestor version of code, where the customized Linux kernel version, the progressed version that represents the security patch, and the prior version immediately before the security patch are all in the same code family as the common ancestor and descend, directly or indirectly, from the common ancestor.

In one embodiment, an initial or quick pass check is performed to determine if the security issue is potentially relevant to the progression candidate version of code based on progression of the code along the code path from an ancestor version to the progressed version. The progressed version of code reflecting the security fix and progression candidate version of code may both stem from an ancestor version of code at some point in their near or distant ancestry towards a root or base version of code, with many changes possible between these later versions of code and the ancestor version of code. In this embodiment, the security tool may crawl up an ancestry tree away from the progressed version of code towards the ancestor version of code to determine if the code that is being patched was first introduced after the ancestor version of code (i.e., after the fork point). If the part modified by the security patch is new or beyond a threshold amount different from a same part that was present in the ancestor version of code, the security tool may determine that the security patch is unlikely to be relevant to the progression candidate version of code. If the part modified by the security patch remained the same or similar back to the fork point, the security tool may determine that the security patch is likely to be relevant to the progression candidate version of code, depending on whether the security patch has already been implemented in the progression candidate version of code.

The security tool may also crawl the ancestry tree away from the ancestor version of code down towards the progression candidate version of code. If the part modified by the security change remains unchanged between the distant prior version and the progression candidate version of code, and if the progression candidate version of code descends, directly or indirectly, from the ancestor version of code, the change may be expected to be compatible with the progression candidate version of code, as the distance between the parts of the code that changed is zero in this example. In this example, the code that was changed by the security patch can also be traced identically back to the common ancestor version. In other examples, even with a non-zero distance between (a) the relevant part of the common ancestor version of code and a relevant part of a prior version of code preceding the security change of the progressed version of code, and/or (b) the relevant part of the common ancestor version of code and the corresponding part of the progression candidate version of code, the change may still be compatible if the change is valid and otherwise not made already for the progression candidate version of code.

Verifying Whether Security Fixes have Already Occurred

In one embodiment, for one or more differences identified as security fixes in a same code family as the progression candidate version of code, the security tool may determine that the progression candidate version of code has already changed to reflect those one or more differences. In other words, the security patches have already occurred along a fork of the progression candidate version of code. Once the difference between the progressed version of code and the prior version of code has been identified, for example, in a difference file, process 100 of FIG. 1 continues in step 108 to determine whether the difference is reflected in one or more other differences between two or more other versions of code in a lineage of the progression candidate version of code. In one embodiment, this determination can be made by matching the change represented by the progressed version of code against a set of changes that have occurred to the progression candidate version of code, version to version, from a common ancestor version of code of both the progression candidate version of code and the progressed version of code up to the progression candidate version of code. A determination is made in step 110 if the difference has been reflected.

If the changes represented by the security fix have been made by a patch between the ancestor version of code and the progression candidate version of code, the progression candidate version of code is determined to already be fixed with respect to the security issue. In this scenario, the process may continue in step 118 to apply other security checks to the progression candidate version of code until there are no more security checks to apply.

If the changes represented by the security fix have not been made by a patch between the ancestor version of code and the progression candidate version of code, then, in step 112, the particular security issue is logged for the progression candidate version of code. For example, the particular security issue may be the subject of a report about multiple security issues of different types found for the progression candidate version of code.

Figure 3A:
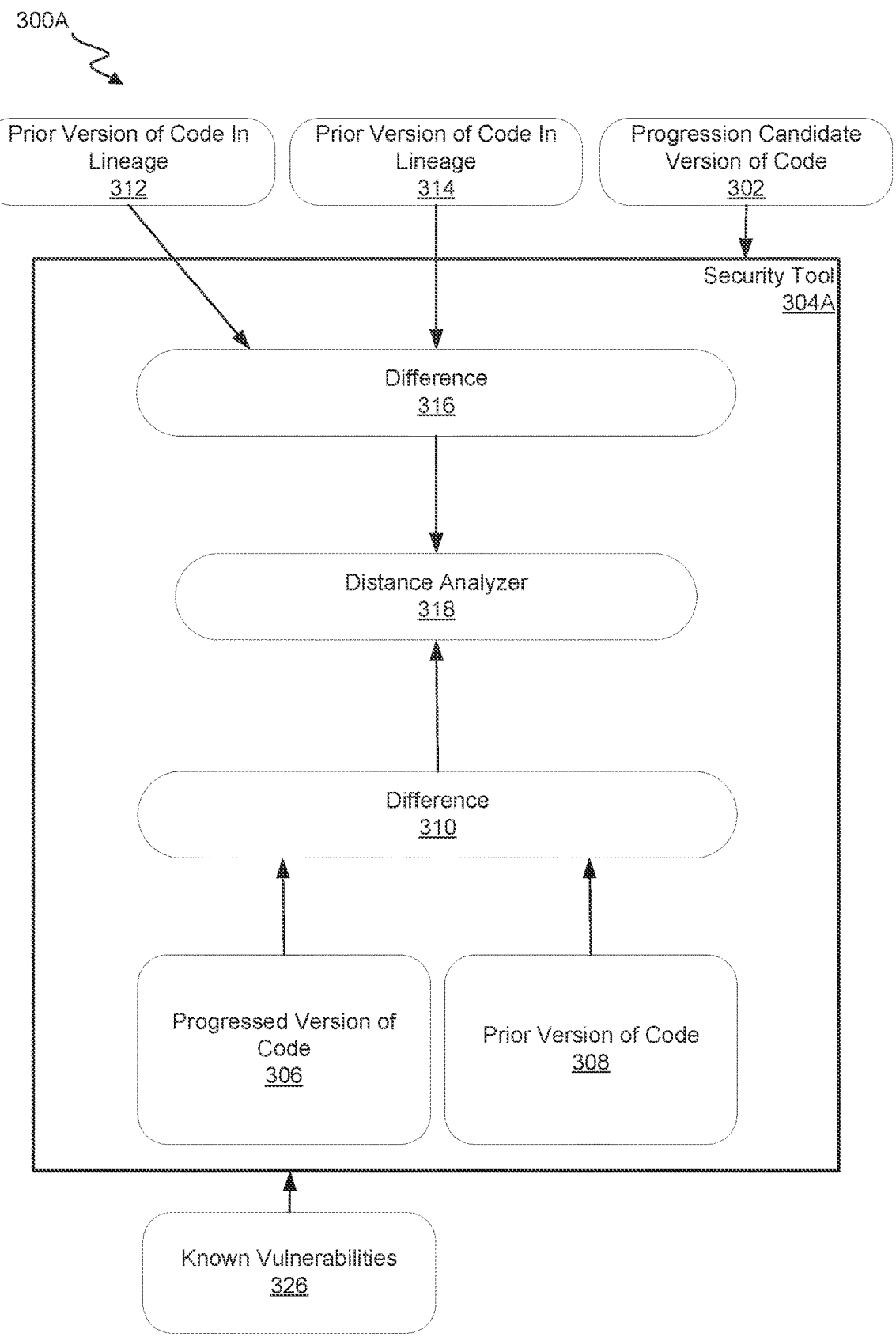
FIG. 3A is a diagram of a security tool for determining if the difference between a progressed version of code and a prior version of code is reflected in the progression candidate version of code.

FIG. 3A shows a security tool for determining if the difference between a progressed version of code and a prior version of code is reflected in the progression candidate version of code. As shown, security tool 304A determines a difference 310 between prior version of code 308 and progressed version of code 306. For example, progressed version of code 306 may be identified based on code that addresses known vulnerabilities 326. Security tool 304A also determines a difference 316 between prior version of code 312 in a lineage to a common ancestor node and prior version of code 314 in a lineage to the common ancestor node. The common ancestor node is an ancestor of progression candidate version of code 302, progressed version of code 306, prior version of code 308, prior version of code 312, and prior version of code 314. Difference 316 reflects a change made towards progression candidate version of code, and difference 310 reflects a change made towards progressed version of code 306, which is known to address a particular security issue.

Distance analyzer 318 determines a distance or similarity score between difference 310 and difference 316, for example, by comparing a text of a difference file storing difference 310 to a text of a difference file storing difference 316. The difference files store information about the lines of code that changed, and optionally information about functions or other sections of code encapsulating the changes. The difference files are generated in the same manner so they can be compared character by character. If distance analyzer 318 determines the difference is small enough to consider the security fix of difference 310 being reflected by difference 316, then security tool 304A marks progression candidate version of code 302 as having the security fix reflected by progressed version of code 306. Similarly, if distance analyzer 318 determines the similarity score is high enough to consider the security fix of difference 310 being reflected by difference 316, then security tool 304A marks progression candidate version of code 302 as having the security fix reflected by progressed version of code 306. In one embodiment, a confidence level is generated for the distance or score generated using fuzzy distance or fuzzy comparison logic.

Distance analyzer may compare the differences between all consecutive versions to difference 310 in distance analyzer 318 to determine if any of the distances are small enough to be considered as reflecting the security fix of progressed version of code 306. If none of the distances are small enough to be considered as reflecting the security fix of progressed version of code 306, security tool 304A marks progression candidate version of code 302 as not having the security fix. Processing may continue to propose a change or generate a security report about progression candidate version of code.

To determine whether the progression candidate version of code reflects the differences of the patch that results in the progressed version of code, the patch that results in the progressed version of code is compared with patches in the lineage of the progression candidate version of code. In other words, the security changes reflected by the progressed version of code are matched against changes that have already occurred iteratively between an ancestor version of code and the progression candidate version of code. The difference file that reflects the changes that resulted in the progressed version of code is used to find a similar change in the lineage of the progression candidate version of code. A difference file determined for the patch leading to the progressed version of code may be compared with difference files for each change occurring in a version-to-version history of changes between the ancestor version of code and the progression candidate version of code. In one embodiment, a distance is determined between the difference file and the difference files for each change occurring in the version-to-version history of changes along the lineage of the progression candidate version of code after a fork point. For example, the distance may be determined based on a number of characters, words, and/or lines different between the difference file of the security fix and a difference file between two versions in the version-to-version history of changes.

The distance analyzer may determine a distance between the patch that caused the progressed version of code and a patch between two versions of code in a lineage to the progression candidate version of code. This distance may be determined in the same way as described herein with respect to a distance determined between a reference security patch and the patch that resulted in the progressed version of code. For example, the distance may be the minimum number of characters that would be changed if the patch resulting in the progressed version of code were transformed into the patch between two versions in the lineage of the progression candidate version of code. In another example, the distance may be the minimum number of words that would be changed if the patch resulting in the progressed version of code were transformed into the patch between two versions in the lineage of the progression candidate version of code. In various examples, certain variables, commands, syntax, object references, references to structures, or references to other logical resources may be excluded from the distance comparison, or may be counted as a fixed number of characters or words of difference, to ensure that a long object name difference does not necessarily lead to a large difference if all other factors are the same between the code changes. In another example, semantically equivalent strings are treated as having no distance between each other, as described above with respect to determining the distance between the reference patch and the progressed version of code.

In one embodiment, the distance analyzer uses regular expressions to match text that can be safely ignored in the distance comparison. For example, commenting text and text that has no impact on code output may be ignored in the distance comparison between different sets of text. In another embodiment, the distance analyzer uses regular expressions to map some expressions to semantically equivalent other expressions, so the distance between such expressions will end up as zero even if such expressions were represented differently in different files.

In a particular embodiment, the distance between the progressed version of code's patch and the reference security patch is determined using the Levenshtein algorithm for computing the Levenshtein distance between the patches, as described above with respect to determining the distance between the reference patch and the progressed version of code.

In one embodiment, the distance may be determined in absolute terms. In this example, a distance of greater than 5 characters between versions of code may be considered to not accurately reflect the security change to the progressed version of code. In another embodiment, the distance is determined based on a percentage of total character differences between the target difference (reflected by the patch resulting in the progressed version of code) and another difference between two versions in a lineage of the progression candidate version. For example, in order to count as a match, a distance analyzer having a cutoff at 5% of the overall changes may require a very small (2 characters) or even identical distance between a small target difference (e.g. 40 characters) and another difference between two versions. By using the percentage of overall difference, a relatively larger target difference file (400 characters) may be counted as a match with a larger distance (up to 20 characters) between the larger target difference and another difference between two versions.

In one embodiment, the distance is determined by focusing on a section, function, or class in which the security fix occurred, while omitting changes that occurred to other sections, functions, or classes. These omissions of irrelevant sections may be made for both the target difference as well as the differences determined between other versions in the lineage of the progression candidate version.

In one embodiment, a Levenshtein module in Go can be applied to identify added or removed lines in the file using the following snippet of code:

```
// Compare the diff file with the target kernel file
scanner:=bufio.NewScanner(targetFile)
var lineNumber int
for scanner.Scan( ) {
    lineNumber++
    line:=scanner.Text( )
    //Check if the line is present
    for_, addedLine:=range addedLines {
        if    levenschtein.ComputeDistance(addedLine[1:],
            line)<=2 {
```

```
    fmt.Println("Line % d is present in the kernel file
        (added line: % s)\n", lineNumber, addedLine)
    }
}
//Check if the line is absent
for _, deletedLine:=range deletedLines {
    if    levenshtein.ComputeDistance(deletedLine[1:],
        line)<=2 {
        fmt.Println(line % d is absent in the kernel file
            (deleted line: % s)\n", lineNumber, deleted-
            Line)
    }
  }
}
```

In one embodiment, the distance is determined between added or removed lines of code reflected in the patch resulting in the progressed version of code and added or removed lines of code in one or more patches in a lineage of the progression candidate version of code, even though the difference file itself may contain additional information. In a particular embodiment, all differences after the ancestor version of code are grouped together into a single difference file, and a portion of that difference file specific to a section covered by the patch to the progressed version of code is analyzed to determine the distance between that portion and the patch to the progressed version of code.

For those changes from the security fix that have been determined to have already occurred in the progression candidate version of code, the progression candidate version of code may be marked accordingly with metadata indicating that the security fix has already occurred. This metadata indicating what security fixes have and have not been reflected in the progression candidate version of code may be included in a security report about the progression candidate version of code.

In some cases, one of the patches has minimal information for comparison. For example, the patch may not contain a function name and is applied either in the header or even other type of extensions. For those edge cases, a special-purpose difference file targeting header changes or other types of extensions may be used to identify patterns for accurately evaluating changes. If the special-purpose difference is detected in both the progressed version of code and in the lineage of the progression candidate version of code, the security fix may be said to have occurred for the progression candidate version of code.

In some examples, the difference file reflects such minor change, such as adding or removing a single variable, that the change cannot be matched up with any specific change in another patch. In this example, the security tool may indicate that the change could not be located in the progression candidate version of code's lineage with a high enough confidence, but also that the change cannot be judged as absent with a high enough confidence. In this scenario, the progression candidate version of code may be marked as possibly having the security issue. In most scenarios, the security tool accurately locates a similar patch in the progression candidate version of code's lineage, or accurately fails to locate a similar patch in the progression candidate version of code's lineage, with high confidence to accurately verify (a) whether the security issue is already addressed in the lineage between an ancestor node and the progression candidate version of code, or (b) if not, whether the progression candidate version of code is compatible with a security fix that addresses the security issue.

In some embodiments, at least part of the prior version of code before the progressed version of code applied the security fix (for example a part that was removed or changed), and/or at least part of the progressed version of code after the security fix is applied (for example, a part that was added or changed), is compared with the progression candidate version of code. If the at least part of the progressed version of code is determined to be present in the progression candidate version of code, in certain scenarios, the progression candidate version of code may be marked as having the security fix. If the at least part of the prior version of code is determined to be present in the progression candidate version of code, in certain scenarios, the progression candidate version of code may be marked as not having the security fix. In one example, the part of the prior version of code must be present and the part of the progressed version of code must be absent in order to mark the progression candidate version of code as not having the security fix. In another example, the part of the progressed version of code must be present and the part of the prior version of code must be absent in order to mark the progression candidate version of code as having the security fix.

Generating and Applying a Proposed Change

Once the particular security issue is logged, in the example shown, process 100 continues to determine whether the particular security issue should be autocorrected, determined in step 114. This determination may be made based on a configuration setting preconfigured before process 100 began, or based on feedback from a prompt to a user about whether the security tool should autocorrect the particular security issue. If the issue is not to be autocorrected, process 100 continues to step 118, where other security checks are applied to the progression candidate version of code. If the issue is to be autocorrected, process 100 continues to step 116, where a proposed change is generated and applied to a corresponding part of the progression candidate version of code.

In one embodiment, generating a proposed change begins with identifying a corresponding part of the progression candidate version of code that is closest to the prior part of the prior version of code. In order to find the part of the progression candidate version of code that is closest to the prior part of the prior version of code, the security tool may first identify parts of the progression candidate code that contain commands, syntax, object references, references to structures, or references to other logical resources that are also present in the prior part of the prior version of code that existed before the security patch was applied to generate the progressed part of the progressed version of code. This high-level search may result in several candidate parts of the progression candidate code that could correspond to the prior part of the prior version of code.

In one embodiment, contents of an entire section of the prior version of code, before a change was committed by the progressed version of code to modify the entire section of the prior version of code, is searched within the progression candidate version of code, and the search results in multiple "hits" or sections of the progression candidate version of code that potentially match or at least partially match the section of the prior version of code. These multiple hits or sections may be further broken up to adjust boundaries around the sections of the progression candidate version of code so the boundaries include only that code which could match the section of the prior version of code. For example, the boundary may be moved in, narrowing the resulting section, until code is found in common with the section of the prior version of code.

Once parts of the progression candidate version of code are available for comparison with the prior part of prior version of code, security tool may proceed to identify a corresponding part of the progression candidate version of code that is closest to the prior part of the prior version of code. If only one part of the progression candidate version of code matches the prior part of the prior version of code exactly, the one exactly matching part may be chosen as the corresponding part of the progression candidate version of code. If more than one part of the progression candidate version of code matches and/or no part matches the prior part of the prior version of code exactly, a more complex determination must be made on which part is the corresponding part of the progression candidate version of code.

The distance between the prior part of the prior version of code and different candidate parts of the progression candidate version of code may be determined using the Levenshtein algorithm for determining distance, as described with refence to comparing the distances between difference files. In this example, the distances are between parts of the source code, namely the prior part of the prior version of code that existed before the security fix of the progressed version of code, and the candidate parts of the progression candidate version of code. A part with the minimum distance may be selected as the corresponding part of the progression candidate version of code, for receiving the security fix.

Once the corresponding part of the progression candidate version of code is identified, the process of finding security issues for the progression candidate version of code may include a step for determining the compatibility of changes that were applied to the prior part of the prior version of code if they were to be applied to the corresponding part of the progression candidate version of code.

Figure 3B:
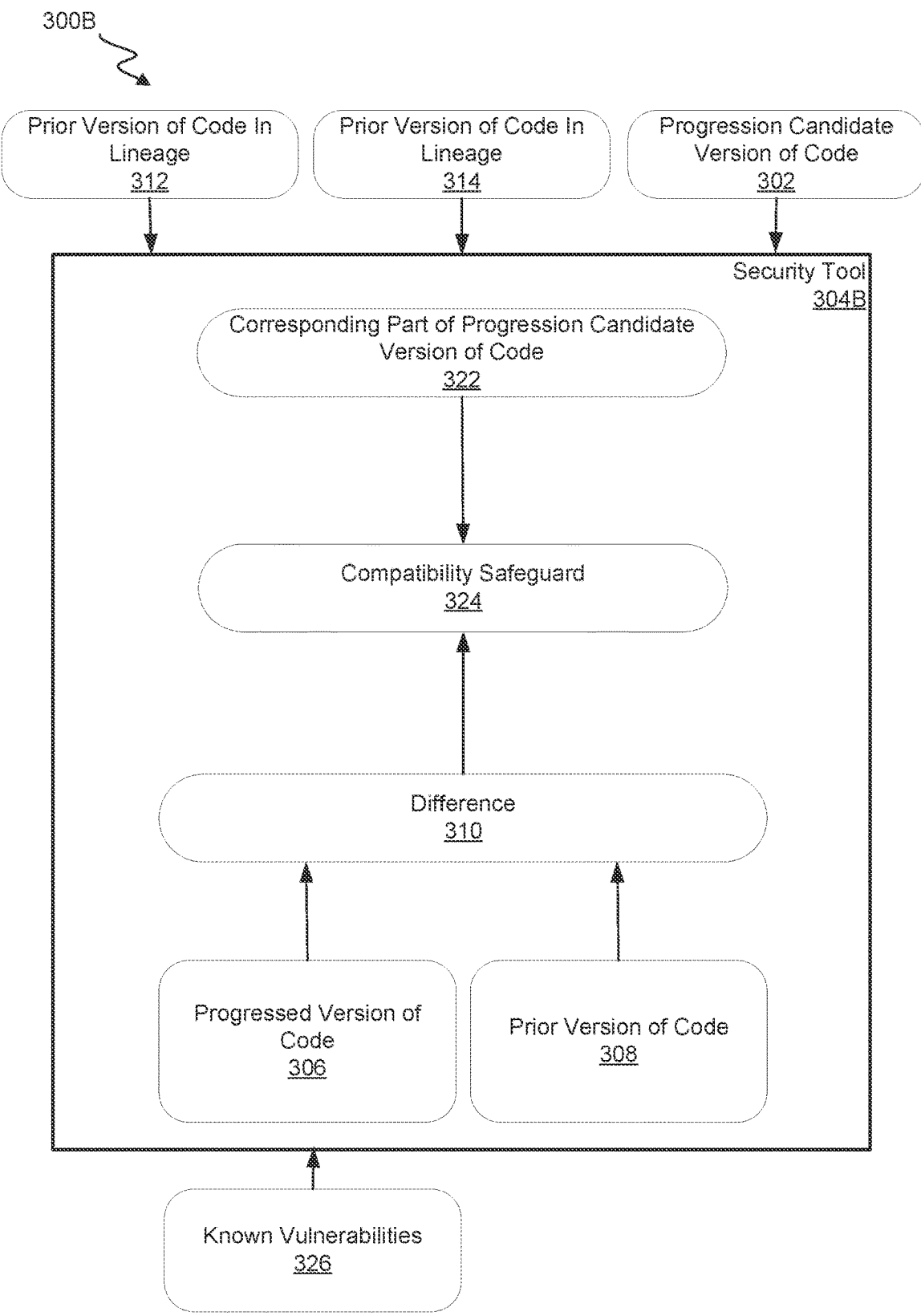
FIG. 3B is a diagram of a security tool for determining a compatibility of a corresponding part of the progression candidate version of code and a difference to be applied.

FIG. 3B shows the security tool components for determining a compatibility of a corresponding part of the progression candidate version of code and a difference to be applied. As shown, difference 310 between progressed version of code 306 and prior version of code 308 is input into compatibility safeguard 324. For example, progressed version of code 306 may be identified based on code that addresses known vulnerabilities 326. Compatibility safeguard 324 also consumes the corresponding part of progression candidate version of code 322. Compatibility safeguard 324 then analyzes whether applying difference 310 to corresponding part 322 would result in compiler errors or other syntax errors, object or variable naming errors, late object declarations, or other issues that may arise from applying difference 310 to progression candidate version of code 302 that is not exactly the same as prior version of code 308 for which difference 310 was originally intended. If compatibility safeguard 324 determines that progression candidate version of code 302 would compile with difference 310 applied to corresponding part of progression candidate version of code, without any expected compilation or runtime errors, compatibility safeguard may store an indication that difference 310 has been checked as safe for application to progression candidate version of code 302. In another embodiment, determining that the difference 310 is not safe to apply to progression candidate version of code 302 may prevent security tool 304B from storing the difference as a proposed change.

If there is approval to apply the proposed change, with or without user input and with or without manual review, the proposed change is applied to the corresponding part of the progression candidate version of code. If there is approval to generate but not apply the proposed change, the proposed change may be logged in association with the progression candidate version of code.

Compiling Comprehensive Security Reports

Once the particular security issue has been logged and/or the proposed change has been generated or made, process 100 of FIG. 1 continues to step 118, where other security checks are applied to the progression candidate version of code. If information about the progression candidate version of code was logged, for example in step 116, such logged information may be combined with information determined as a result of the other security checks for a comprehensive report about the security issues with the progression candidate version of code.

FIG. 2 shows the security tool passing the proposed change for review 218 to a manual and/or static review of source code for security vulnerabilities 222. In another embodiment, the stored indication of the security issue on the progression candidate version of code is passed to manual and/or static review of source code for security vulnerabilities 222 without generating or passing a proposed change. In one embodiment, additional security review is provided by security tool 204, for example, with respect to other known security issues that have not yet been analyzed, before passing a report or other information. Such information passed from security tool 204 may be combined in a report that results from steps performed by the security tool as well as manual and/or static review of the source code. In one example, the static review of source code includes Static Application Security Testing (SAST), which looks at source code to identify vulnerabilities. Static review of the source code examines the source code for security deficiencies on the face of the source code without having to execute the source code. Such deficiencies may be present, for example, if the source code allows untrusted user input to be sent without sanitization to secure sensitive parts of a system allowing the system to expose private information. In a specific example of CWE-137 from MITRE, the security issue may relate to "Weaknesses . . . related to the creation or neutralization of data using an incorrect format." Along these lines, CWE-91: XML Injection (aka Blind XPath Injection) relates to security issues where "[t]he product does not properly neutralize special elements that are used in XML, allowing attackers to modify the syntax, content, or commands of the XML before it is processed by an end system." The combined results from different types of security reviews, including from the security tool 204, may be stored as logged results 224.

In one embodiment, the security tool outputs a report in JSON and/or PDF format to describe security issues found with progression candidate version of code and optionally other versions of code also under review. The report may include any one or more of: a link to a reference security issue, metadata about the reference security issue, a link to the progressed version of code, metadata about the progressed version of code, a link to the progression candidate version of code, metadata about the progression candidate version of code, information about a proposed change, a link to trigger the proposed change, and/or links and metadata about other security issues that may have been detected in the progression candidate version of code. Such a report may be provided as a result of a request to analyze the progression candidate version of code, or on a subscription basis as new issues are discovered with progression candidate version of code.

Computer System Architecture

Figure 4:
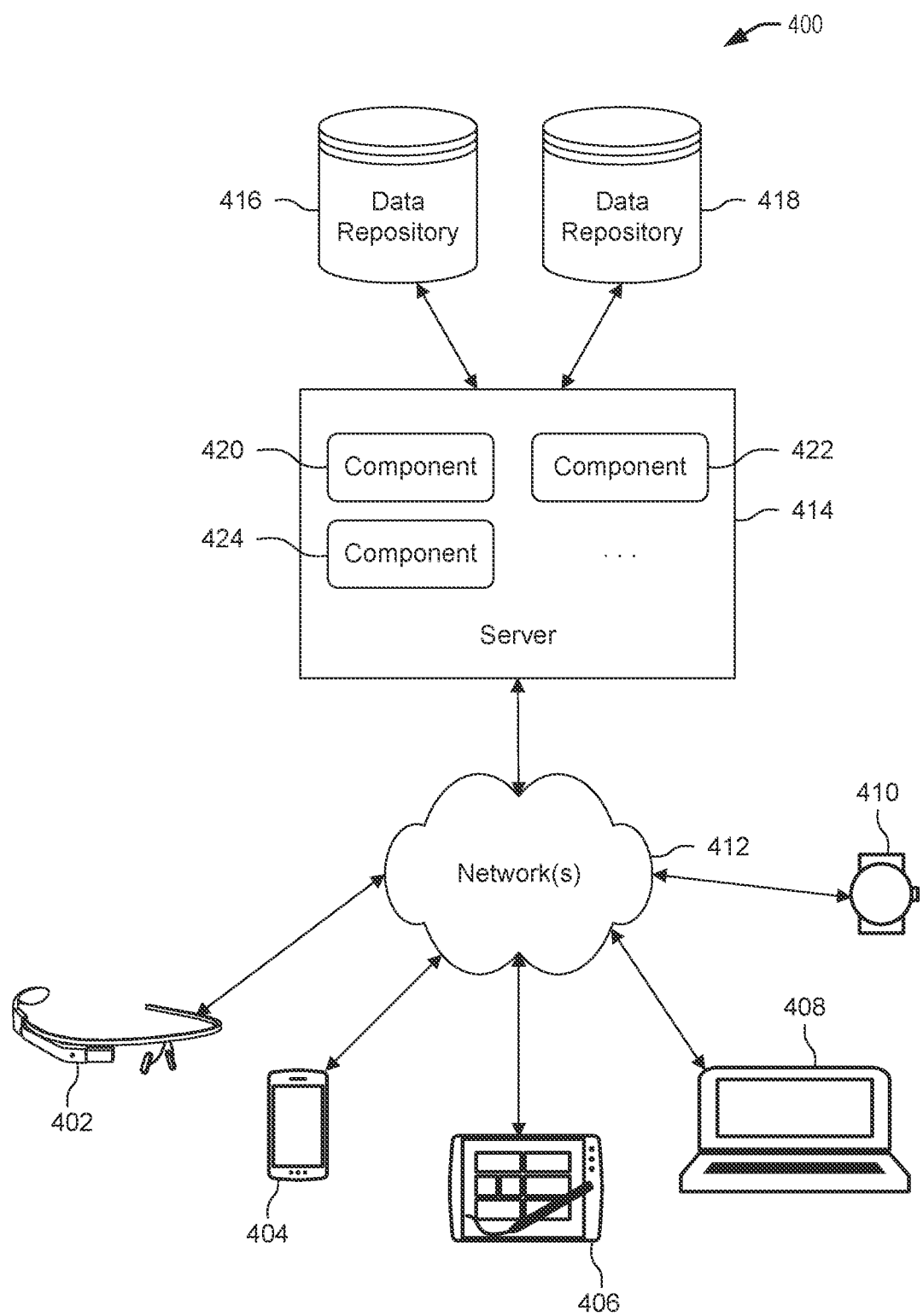
FIG. 4 depicts a simplified diagram of a distributed system for implementing certain aspects.

FIG. 4 depicts a simplified diagram of a distributed system 400 for implementing an embodiment. In the illustrated embodiment, distributed system 400 includes one or more client computing devices 402, 404, 406, 408, and/or 410 coupled to a server 414 via one or more communication networks 412. Clients computing devices 402, 404, 406, 408, and/or 410 may be configured to execute one or more applications.

In various aspects, server 414 may be adapted to run one or more services or software applications that enable techniques for detecting security issues in versions of code.

In certain aspects, server 414 may also provide other services or software applications that can include non-virtual and virtual environments. In some aspects, these services may be offered as web-based or cloud services, such as under a Software as a Service (SaaS) model to the users of client computing devices 402, 404, 406, 408, and/or 410. Users operating client computing devices 402, 404, 406, 408, and/or 410 may in turn utilize one or more client applications to interact with server 414 to utilize the services provided by these components.

In the configuration depicted in FIG. 4, server 414 may include one or more components 420, 422 and 424 that implement the functions performed by server 414. These components may include software components that may be executed by one or more processors, hardware components, or combinations thereof. It should be appreciated that various different system configurations are possible, which may be different from distributed system 400. The embodiment shown in FIG. 4 is thus one example of a distributed system for implementing an embodiment system and is not intended to be limiting.

Users may use client computing devices 402, 404, 406, 408, and/or 410 for techniques for detecting security issues in versions of code in accordance with the teachings of this disclosure. A client device may provide an interface that enables a user of the client device to interact with the client device. The client device may also output information to the user via this interface. Although FIG. 4 depicts only five client computing devices, any number of client computing devices may be supported.

The client devices may include various types of computing systems such as smart phones or other portable handheld devices, general purpose computers such as personal computers and laptops, workstation computers, smart watches, smart glasses, or other wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Meta Quest®, RayBan Stories®, Apple Vision Pro®, Google Glass® head mounted display, Apple Watch®, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 412 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 412 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 414 may be composed of one or more general purpose computers, specialized server computers (including, by way of example, PC (personal computer) servers, UNIX® servers, mid-range servers, mainframe computers, rack-mounted servers, etc.), server farms, server clusters, a Real Application Cluster (RAC), database servers, or any other appropriate arrangement and/or combination. Server 414 can include one or more virtual machines running virtual operating systems, or other computing architectures involving virtualization such as one or more flexible pools of logical storage devices that can be virtualized to maintain virtual storage devices for the server. In various aspects, server 414 may be adapted to run one or more services or software applications that provide the functionality described in the foregoing disclosure.

The computing systems in server 414 may run one or more operating systems including any of those discussed above, as well as any commercially available server operating system. Server 414 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 414 may include one or more applications to analyze and consolidate data feeds and/or event updates received from users of client computing devices 402, 404, 406, 408, and/or 410. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 414 may also include one or more applications to display the data feeds and/or real-time events via one or more display devices of client computing devices 402, 404, 406, 408, and/or 410.

Distributed system 400 may also include one or more data repositories 416, 418. These data repositories may be used to store data and other information in certain aspects. For example, one or more of the data repositories 416, 418 may be used to store information for techniques for detecting security issues in versions of code. Data repositories 416, 418 may reside in a variety of locations. For example, a data repository used by server 414 may be local to server 414 or may be remote from server 414 and in communication with server 414 via a network-based or dedicated connection. Data repositories 416, 418 may be of different types. In certain aspects, a data repository used by server 414 may be a database, for example, a relational database, a container database, an Exadata storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 416, 418 may also be used by applications to store application data. The data repositories used by applications may be of different types such as, for example, a key-value store repository, an object store repository, or a general storage repository supported by a file system.

In one embodiment, server 414 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 5:
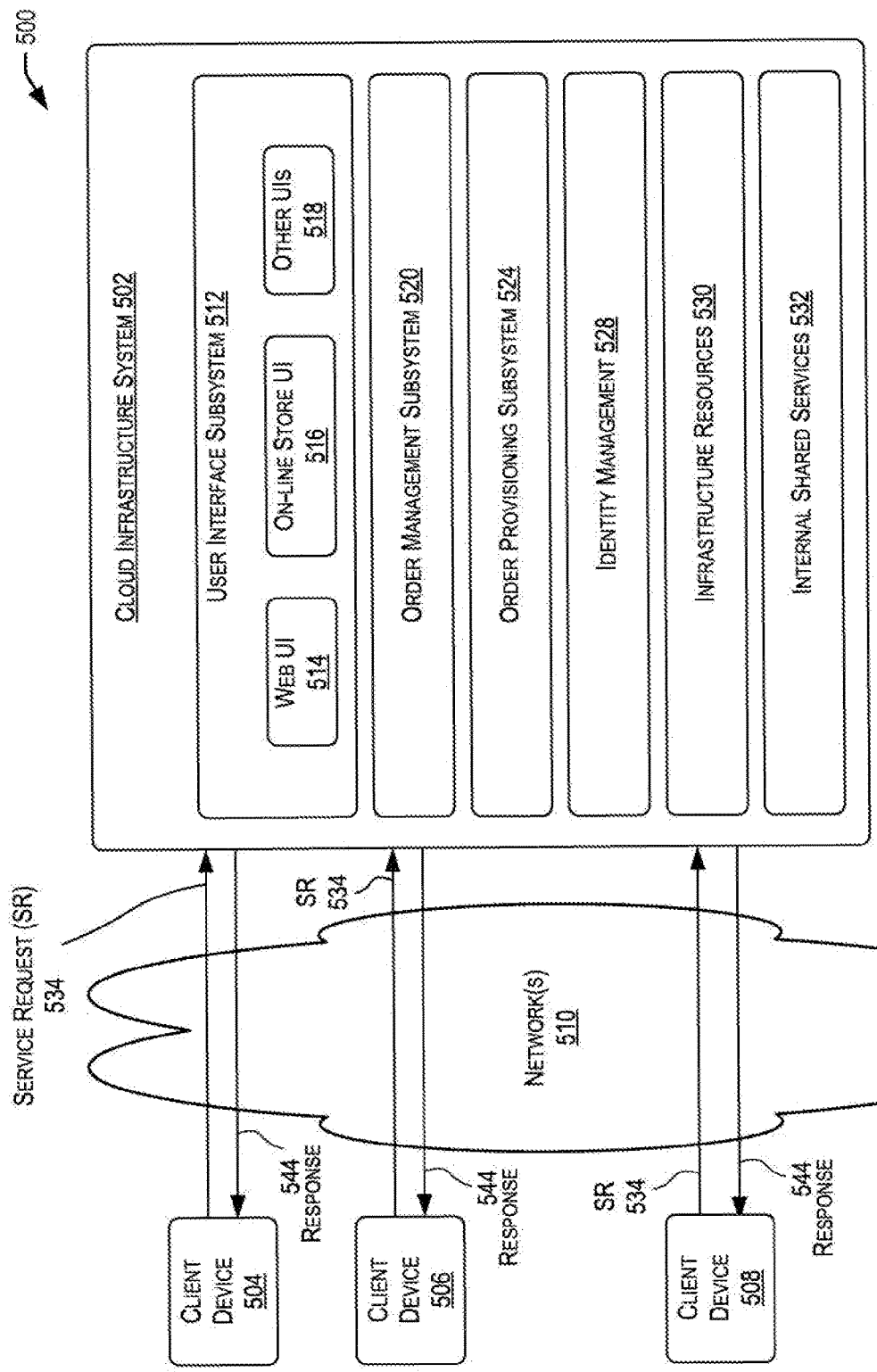
FIG. 5 is a simplified block diagram of one or more components of a system environment by which services provided by one or more components of an embodiment system may be offered as cloud services, in accordance with certain aspects.

In certain aspects, the techniques for detecting security issues in versions of code as described in this disclosure may be offered as services via a cloud environment. FIG. 5 is a simplified block diagram of a cloud-based system environment in which various text handling-related services may be offered as cloud services, in accordance with certain aspects. In the embodiment depicted in FIG. 5, cloud infrastructure system 502 may provide one or more cloud services that may be requested by users using one or more client computing devices 504, 506, and 508. Cloud infrastructure system 502 may comprise one or more computers and/or servers that may include those described above for server 412. The computers in cloud infrastructure system 502 may be organized as general purpose computers, specialized server computers, server farms, server clusters, or any other appropriate arrangement and/or combination.

Network(s) 510 may facilitate communication and exchange of data between clients 504, 506, and 508 and cloud infrastructure system 502. Network(s) 510 may include one or more networks. The networks may be of the same or different types. Network(s) 510 may support one or more communication protocols, including wired and/or wireless protocols, for facilitating the communications.

The embodiment depicted in FIG. 5 is only one example of a cloud infrastructure system and is not intended to be limiting. It should be appreciated that, in some other aspects, cloud infrastructure system 502 may have more or fewer components than those depicted in FIG. 5, may combine two or more components, or may have a different configuration or arrangement of components. For example, although FIG. 5 depicts three client computing devices, any number of client computing devices may be supported in alternative aspects.

The term cloud service is generally used to refer to a service that is made available to users on demand and via a communication network such as the Internet by systems (e.g., cloud infrastructure system 502) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 510 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation® of Redwood Shores, California, such as database services, middleware services, application services, and others.

In certain aspects, cloud infrastructure system 502 may provide one or more cloud services using different models such as under a Software as a Service (SaaS) model, a Platform as a Service (PaaS) model, an Infrastructure as a Service (IaaS) model, and others, including hybrid service models. Cloud infrastructure system 502 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 502. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

Cloud services are generally provided on an on-demand self-service basis, subscription-based, elastically scalable, reliable, highly available, and secure manner. For example, a tenant, via a subscription order, may order one or more services provided by cloud infrastructure system 502. Cloud infrastructure system 502 then performs processing to provide the services requested in the tenant's subscription order. Cloud infrastructure system 502 may be configured to provide one or even multiple cloud services.

Cloud infrastructure system 502 may provide the cloud services via different deployment models. In a public cloud model, cloud infrastructure system 502 may be owned by a third party cloud services provider and the cloud services are offered to any general public tenant, where the tenant can be an individual or an enterprise. In certain other aspects, under a private cloud model, cloud infrastructure system 502 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 502 and the services provided may be shared by several organizations in a related community. Various other models such as hybrids of the above mentioned models may also be used.

Client computing devices 504, 506, and 508 may be of different types (such as devices 402, 404, 406, and 408 depicted in FIG. 4) and may be capable of operating one or more client applications. A user may use a client device to interact with cloud infrastructure system 502, such as to request a service provided by cloud infrastructure system 502. For example, a user may use a client device to request a chat bot service described in this disclosure.

In some aspects, the processing performed by cloud infrastructure system 502 for providing Chabot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 502 for determining the intent of an utterance. The data used for this analysis may include structured data (e.g., data stored in a database or structured according to a structured model) and/or unstructured data (e.g., data blobs (binary large objects)).

As depicted in the embodiment in FIG. 5, cloud infrastructure system 502 may include infrastructure resources 530 that are utilized for facilitating the provision of various cloud services offered by cloud infrastructure system 502. Infrastructure resources 530 may include, for example, processing resources, storage or memory resources, networking resources, and the like.

In certain aspects, to facilitate efficient provisioning of these resources for supporting the various cloud services provided by cloud infrastructure system 502 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 502 may itself internally use services 532 that are shared by different components of cloud infrastructure system 502 and which facilitate the provisioning of services by cloud infrastructure system 502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 502 may comprise multiple subsystems. These subsystems may be implemented in software, or hardware, or combinations thereof. As depicted in FIG. 5, the subsystems may include a user interface subsystem 512 that enables users of cloud infrastructure system 502 to interact with cloud infrastructure system 502. User interface subsystem 512 may include various different interfaces such as a web interface 514, an online store interface 516 where cloud services provided by cloud infrastructure system 502 are advertised and are purchasable by a consumer, and other interfaces 518. For example, a tenant may, using a client device, request (service request 534) one or more services provided by cloud infrastructure system 502 using one or more of interfaces 514, 516, and 518. For example, a tenant may access the online store, browse cloud services offered by cloud infrastructure system 502, and place a subscription order for one or more services offered by cloud infrastructure system 502 that the tenant wishes to subscribe to. The service request may include information identifying the tenant and one or more services that the tenant desires to subscribe to. For example, a tenant may place a subscription order for a Chabot related service offered by cloud infrastructure system 502. As part of the order, the tenant may provide information identifying for input (e.g., utterances).

In certain aspects, such as the embodiment depicted in FIG. 5, cloud infrastructure system 502 may comprise an order management subsystem (OMS) 520 that is configured to process the new order. As part of this processing, OMS 520 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 520 may then invoke the order provisioning subsystem (OPS) 524 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 524 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 502 may send a response or notification 544 to the requesting tenant to indicate when the requested service is now ready for use. In some instances, information (e.g., a link) may be sent to the tenant that enables the tenant to start using and availing the benefits of the requested services.

Cloud infrastructure system 502 may provide services to multiple tenants. For each tenant, cloud infrastructure system 502 is responsible for managing information related to one or more subscription orders received from the tenant, maintaining tenant data related to the orders, and providing the requested services to the tenant or clients of the tenant. Cloud infrastructure system 502 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 502 may provide services to multiple tenants in parallel. Cloud infrastructure system 502 may store information for these tenants, including possibly proprietary information. In certain aspects, cloud infrastructure system 502 comprises an identity management subsystem (IMS) 528 that is configured to manage tenant's information and provide the separation of the managed information such that information related to one tenant is not accessible by another tenant. IMS 528 may be configured to provide various security-related services such as identity services, such as information access management, authentication and authorization services, services for managing tenant identities and roles and related capabilities, and the like.

Figure 6:
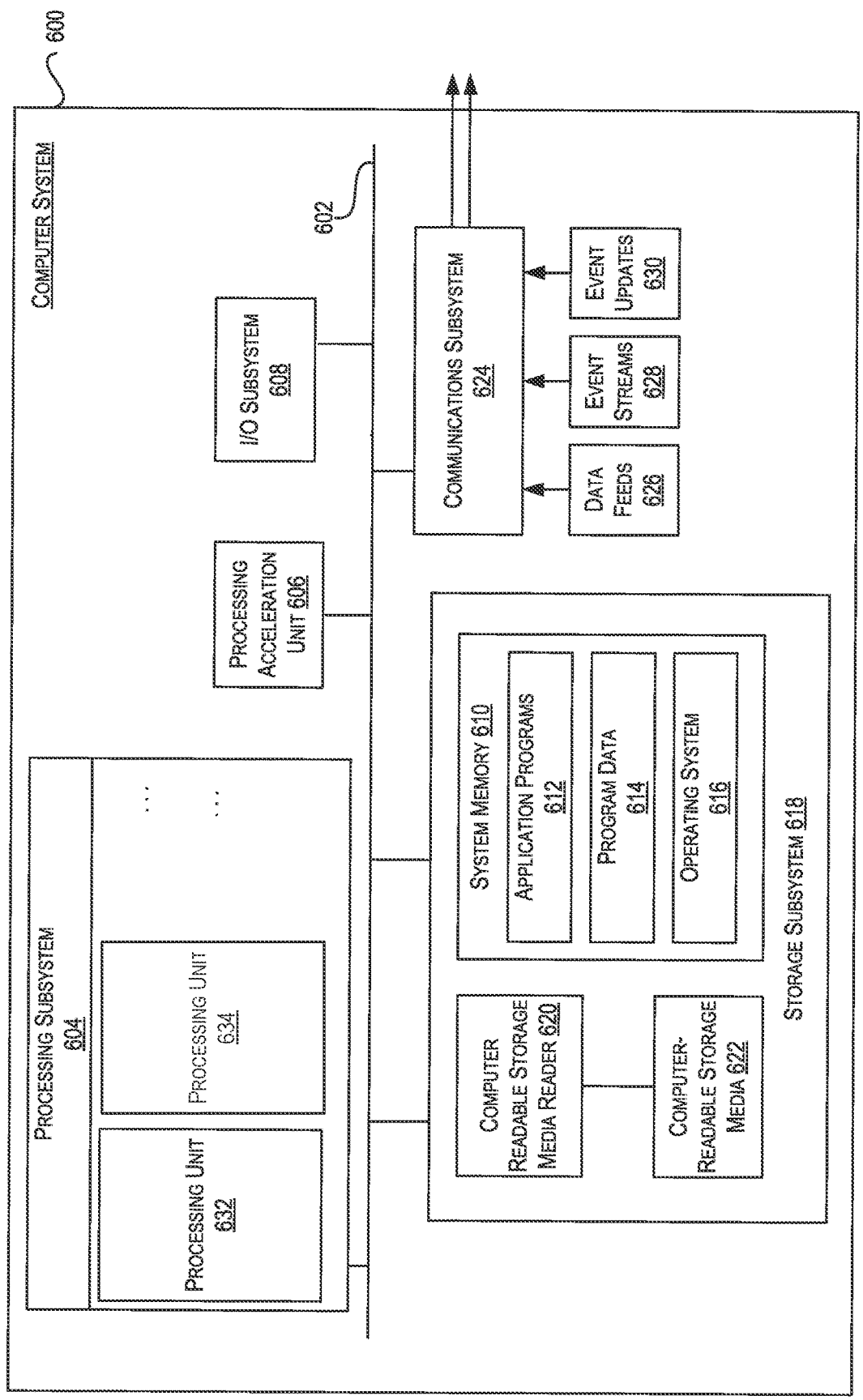
FIG. 6 illustrates an example computer system that may be used to implement certain aspects.

FIG. 6 illustrates an exemplary computer system 600 that may be used to implement certain aspects. For example, in some aspects, computer system 600 may be used to implement any of the system 100 for checking a progression candidate version of code for security issues as shown in FIG. 1 and various servers and computer systems described above. As shown in FIG. 6, computer system 600 includes various subsystems including a processing subsystem 604 that communicates with a number of other subsystems via a bus subsystem 602. These other subsystems may include a processing acceleration unit 606, an I/O subsystem 608, a storage subsystem 618, and a communications subsystem 624. Storage subsystem 618 may include non-transitory computer-readable storage media including storage media 622 and a system memory 610.

Bus subsystem 602 provides a mechanism for letting the various components and subsystems of computer system 600 communicate with each other as intended. Although bus subsystem 602 is shown schematically as a single bus, alternative aspects of the bus subsystem may utilize multiple buses. Bus subsystem 602 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 604 controls the operation of computer system 600 and may comprise one or more processors, application specific integrated circuits (ASICs), or field programmable gate arrays (FPGAs). The processors may include be single core or multicore processors. The processing resources of computer system 600 can be organized into one or more processing units 632, 634, etc. A processing unit may include one or more processors, one or more cores from the same or different processors, a combination of cores and processors, or other combinations of cores and processors. In some aspects, processing subsystem 604 can include one or more special purpose co-processors such as graphics processors, digital signal processors (DSPs), or the like. In some aspects, some or all of the processing units of processing subsystem 604 can be implemented using customized circuits, such as application specific integrated circuits (ASICs), or field programmable gate arrays (FPGAs).

In some aspects, the processing units in processing subsystem 604 can execute instructions stored in system memory 610 or on computer readable storage media 622. In various aspects, the processing units can execute a variety of programs or code instructions and can maintain multiple concurrently executing programs or processes. At any given time, some or all of the program code to be executed can be resident in system memory 610 and/or on computer-readable storage media 622 including potentially on one or more storage devices. Through suitable programming, processing subsystem 604 can provide various functionalities described above. In instances where computer system 600 is executing one or more virtual machines, one or more processing units may be allocated to each virtual machine.

In certain aspects, a processing acceleration unit 606 may optionally be provided for performing customized processing or for off-loading some of the processing performed by processing subsystem 604 so as to accelerate the overall processing performed by computer system 600.

I/O subsystem 608 may include devices and mechanisms for inputting information to computer system 600 and/or for outputting information from or via computer system 600. In general, use of the term input device is intended to include all possible types of devices and mechanisms for inputting information to computer system 600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 600 to a user or other computer. User interface output devices may include a display subsystem, indicator lights, or non-visual displays such as audio output devices, etc. The display subsystem may be a cathode ray tube (CRT), a flat-panel device, such as that using a light emitting diode (LED) display, a liquid crystal display (LCD) or plasma display, a projection device, a touch screen, a computer monitor and the like. For example, user interface output devices may include, without limitation, a variety of display devices that visually convey text, graphics, and audio/video information such as monitors, printers, speakers, headphones, automotive navigation systems, plotters, voice output devices, and modems.

Storage subsystem 618 provides a repository or data store for storing information and data that is used by computer system 600. Storage subsystem 618 provides a tangible non-transitory computer-readable storage medium for storing the basic programming and data constructs that provide the functionality of some aspects. Storage subsystem 618 may store software (e.g., programs, code modules, instructions) that when executed by processing subsystem 604 provides the functionality described above. The software may be executed by one or more processing units of processing subsystem 604. Storage subsystem 618 may also provide a repository for storing data used in accordance with the teachings of this disclosure.

Storage subsystem 618 may include one or more non-transitory memory devices, including volatile and non-volatile memory devices. As shown in FIG. 6, storage subsystem 618 includes a system memory 610 and a computer-readable storage media 622. System memory 610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 600, such as during start-up, may typically be stored in the ROM. The RAM typically contains data and/or program modules that are presently being operated and executed by processing subsystem 604. In some implementations, system memory 610 may include multiple different types of memory, such as static random access memory (SRAM), dynamic random access memory (DRAM), and the like.

By way of example, and not limitation, as depicted in FIG. 6, system memory 610 may load application programs 612 that are being executed, which may include various applications such as Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 622 may store programming and data constructs that provide the functionality of some aspects. Computer-readable media 622 may provide storage of computer-readable instructions, data structures, program modules, and other data for computer system 600. Software (programs, code modules, instructions) that, when executed by processing subsystem 604 provides the functionality described above, may be stored in storage subsystem 618. By way of example, computer-readable storage media 622 may include non-volatile memory such as a hard disk drive, a magnetic disk drive, an optical disk drive such as a CD ROM, digital video disc (DVD), a Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 618 may also include a computer-readable storage media reader 620 that can further be connected to computer-readable storage media 622. Reader 620 may receive and be configured to read data from a memory device such as a disk, a flash drive, etc.

In certain aspects, computer system 600 may support virtualization technologies, including but not limited to virtualization of processing and memory resources. For example, computer system 600 may provide support for executing one or more virtual machines. In certain aspects, computer system 600 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 600. Accordingly, multiple operating systems may potentially be run concurrently by computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to establish a communication channel to one or more client devices via the Internet for receiving and sending information from and to the client devices. For example, the communication subsystem may be used to transmit a response to a user regarding the inquiry for a Chabot.

Communication subsystem 624 may support both wired and/or wireless communication protocols. For example, in certain aspects, communications subsystem 624 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 624 can provide wired network connectivity (e.g., Ethernet) in addition to or instead of a wireless interface.

Communication subsystem 624 can receive and transmit data in various forms. For example, in some aspects, in addition to other forms, communications subsystem 624 may receive input communications in the form of structured and/or unstructured data feeds 626, event streams 628, event updates 630, and the like. For example, communications subsystem 624 may be configured to receive (or send) data feeds 626 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 624 may be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 624 may also be configured to communicate data from computer system 600 to other computer systems or networks. The data may be communicated in various different forms such as structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a personal digital assistant (PDA)), a wearable device (e.g., a Google Glass® head mounted display), a personal computer, a workstation, a mainframe, a kiosk, a server rack, or any other data processing system. Due to the ever-changing nature of computers and networks, the description of computer system 600 depicted in FIG. 6 is intended only as a specific example. Many other configurations having more or fewer components than the system depicted in FIG. 6 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:
identifying a progressed version of code that:
  has an ancestor version of code that is also an ancestor of a progression candidate version of code, and
  modifies a prior version of code to address a documented security issue that existed in the prior version of code,
wherein:
  the prior version of code is different than the progression candidate version of code,
  the ancestor version of code is different than the progression candidate version of code, and
  the ancestor version of code is different than the prior version of code;
identifying a target difference between the progressed version of code and the prior version of code, wherein identifying the target difference comprises identifying a progression change to at least one line of code between the prior version of code and the progressed version of code, wherein the progression change includes one or more of an addition, removal, or partial modification of the at least one line of code between the prior version of code and the progressed version of code;

identifying one or more other differences between two or more other versions of code in a lineage of the progression candidate version of code;

determining whether the documented security issue has been addressed in the progression candidate version of code by comparing the target difference to the one or more other differences;

based at least in part on determining that the documented security issue has not been addressed in the progression candidate version of code, storing an indication that the progression candidate version of code is associated with the documented security issue.

2. The computer-implemented method of claim 1, further comprising determining a distance between the target difference and a particular difference of the one or more other differences; wherein the distance is a number of character edits needed to transform the target difference to the particular difference; and determining that the documented security issue has not been addressed in the progression candidate version of code based at least in part on the distance.

3. The computer-implemented method of claim 1, wherein said identifying the one or more other differences between the two or more other versions of code in the lineage of the progression candidate version of code comprises:

storing information identifying a path from the ancestor version of code to the progression candidate version of code;

determining that a first prior version of code was changed to a second prior version of code along the path;

identifying a particular difference between the first prior version of code and the second prior version of code.

4. The computer-implemented method of claim 1, wherein said identifying the progressed version of code that addresses the documented security issue is performed in response to a request to analyze the progression candidate version of code, the computer-implemented method further comprising:

adding, to a set of security issues for the progression candidate version of code, the indication that the progression candidate version of code is associated with the documented security issue; wherein one or more other security issues of the set of security issues is based at least in part on a static code analysis of the progression candidate version of code, wherein the static code analysis identifies a vulnerability in how the progression candidate version of code is written without using any documented security issues for a same code family as the progression candidate version of code;

reporting the set of security issues in response to the request.

5. The computer-implemented method of claim 1, further comprising:

parsing a site where information is posted about security issues relating to code projects, the code projects including a particular project having a same code family as the progression candidate version of code;

based at least in part on the site, detecting an association between a proposed fix to the documented security issue and the progressed version of code.

6. The computer-implemented method of claim 1, wherein the prior version of code comprises a plurality of logically distinct sections, wherein at least a first section and a second section were changed between the prior version of code and the progressed version of code, the computer-implemented method further comprising:

determining, based on metadata about the documented security issue, that the documented security issue arose from at least the first section of the plurality of logically distinct sections and not from at least the second section of the plurality of logically distinct sections;

wherein identifying the target difference between the progressed version of code and the prior version of code comprises omitting any changes that were made to said at least the second section of the plurality of logically distinct sections and including one or more changes that were made to said at least the first section of the plurality of logically distinct sections.

7. The computer-implemented method of claim 1, wherein the two or more other versions of code comprise a plurality of logically distinct sections, wherein at least a first section and a second section were changed between a first version of code of the two or more other versions of code and a second version of code of the two or more other versions of code, the computer-implemented method further comprising:

determining that the documented security issue arose from at least the first section of the plurality of logically distinct sections and not from at least the second section of the plurality of logically distinct sections;

wherein identifying the one or more other differences between the two or more other versions of code in the lineage of the progression candidate version of code comprises omitting any changes that were made to said at least the second section of the plurality of logically distinct sections and including one or more changes that were made to said at least the first section of the plurality of logically distinct sections.

8. The computer-implemented method of claim 1, further comprising accessing a set of documented security issues in a same code family as the progression candidate version of code, wherein the set of documented security issues grows over time; further comprising, for an entity associated with the progression candidate version of code, subscribing to any security issues of the growing set of documented security issues in the same code family as the progression candidate version of code, wherein said identifying the progressed version of code that addresses the documented security issue is performed based at least in part on said subscribing to any security issues of the growing set of documented security issues in the same code family as the progression candidate version of code.

9. The computer-implemented method of claim 1, further comprising:

determining that the target difference occurs between a prior part of the prior version of code and a particular part of the progressed version of code;

identifying a corresponding part of the progression candidate version of code that corresponds to the prior part of the prior version of code;

determining that the target difference is compatible with the corresponding part of the progression candidate version of code; and storing the target difference as a proposed change to the progression candidate version of code, wherein the proposed change, if applied, is predicted to fix the documented security issue.

10. A computer-program product comprising one or more non-transitory machine-readable storage media, including stored instructions configured to cause a computing system to perform a set of actions including:
  identifying a progressed version of code that:
    has an ancestor version of code that is also an ancestor of a progression candidate version of code, and
    modifies a prior version of code to address a documented security issue that existed in the prior version of code,
  wherein:
    the prior version of code is different than the progression candidate version of code,
    the ancestor version of code is different than the progression candidate version of code, and
    the ancestor version of code is different than the prior version of code;
  identifying a target difference between the progressed version of code and the prior version of code, wherein identifying the target difference comprises identifying a progression change to at least one line of code between the prior version of code and the progressed version of code, wherein the progression change includes one or more of an addition, removal, or partial modification of the at least one line of code between the prior version of code and the progressed version of code;
  identifying one or more other differences between two or more other versions of code in a lineage of the progression candidate version of code;
  determining whether the documented security issue has been addressed in the progression candidate version of code by comparing the target difference to the one or more other differences;
  based at least in part on determining that the documented security issue has not been addressed in the progression candidate version of code, storing an indication that the progression candidate version of code is associated with the documented security issue.

11. The computer-program product of claim 10, wherein the set of actions further includes: determining a distance between the target difference and a particular difference of the one or more other differences; wherein the distance is a number of character edits needed to transform the target difference to the particular difference; and
  determining that the documented security issue has not been addressed in the progression candidate version of code based at least in part on the distance.

12. The computer-program product of claim 10, wherein said identifying the one or more other differences between the two or more other versions of code in the lineage of the progression candidate version of code comprises:
  storing information identifying a path from the ancestor version of code to the progression candidate version of code;
  determining that a first prior version of code was changed to a second prior version of code along the path;
  identifying a particular difference between the first prior version of code and the second prior version of code.

13. The computer-program product of claim 10, wherein said identifying the progressed version of code that addresses the documented security issue is performed in response to a request to analyze the progression candidate version of code, and wherein the set of actions further include:
  adding, to a set of security issues for the progression candidate version of code, the indication that the progression candidate version of code is associated with the documented security issue; wherein one or more other security issues of the set of security issues is based at least in part on a static code analysis of the progression candidate version of code, wherein the static code analysis identifies a vulnerability in how the progression candidate version of code is written without using any documented security issues for a same code family as the progression candidate version of code;
  reporting the set of security issues in response to the request.

14. The computer-program product of claim 10, wherein the set of actions further includes:
  parsing a site where information is posted about security issues relating to code projects, the code projects including a particular project having a same code family as the progression candidate version of code;
  based at least in part on the site, detecting an association between a proposed fix to the documented security issue and the progressed version of code.

15. The computer-program product of claim 10, wherein the prior version of code comprises a plurality of logically distinct sections, wherein at least a first section and a second section were changed between the prior version of code and the progressed version of code, and wherein the set of actions further includes:
  determining, based on metadata about the documented security issue, that the documented security issue arose from at least the first section of the plurality of logically distinct sections and not from at least the second section of the plurality of logically distinct sections;
  wherein the set of actions includes causing said identifying the target difference between the progressed version of code and the prior version of code at least in part by omitting any changes that were made to said at least the second section of the plurality of logically distinct sections and including one or more changes that were made to said at least the first section of the plurality of logically distinct sections.

16. A system for mitigating security issues in a progression candidate version of code, the system comprising:
  one or more processors;
  a user interface for receiving and processing an input request that identifies a progression candidate version of code;
  one or more storage repositories storing metadata about a plurality of versions of code in a family of the progression candidate version of code;
  one or more non-transitory computer-readable media storing instructions, which, when executed by the system, cause the system to perform a set of actions including:
  processing the input request by identifying a progressed version of code in the plurality of versions of code that:
    has an ancestor version of code that is also in the plurality of versions of code, and
    modifies a prior version of code to address a documented security issue that existed in the prior version of code,
  wherein:
    the prior version of code is different than the progression candidate version of code,
    the ancestor version of code is different than the progression candidate version of code, and
    the ancestor version of code is different than the prior version of code;
  the set of actions further including:
    identifying a target difference between the progressed version of code and the prior version of code, wherein identifying the target difference comprises identifying a progression change to at least one line of code between the prior version of code and the progressed version of code, wherein the progression change includes one or more of an addition, removal, or partial modification of the at least one line of code between the prior version of code and the progressed version of code;

identifying one or more other differences between two or more other versions of code in a lineage of the progression candidate version of code;

determining whether the documented security issue has been addressed in the progression candidate version of code by comparing the target difference to the one or more other differences;

a display configured to display, based at least in part on the system determining that the documented security issue has not been addressed in the progression candidate version of code, an indication that the progression candidate version of code is associated with the documented security issue.

17. The system of claim 16, wherein the set of actions further includes:

determining a distance between the target difference and a particular difference of the one or more other differences; wherein the distance is a number of character edits needed to transform the target difference to the particular difference; and determining that the documented security issue has not been addressed in the progression candidate version of code based at least in part on the distance.

18. The system of claim 16, wherein the set of actions further includes:

identifying the one or more other differences between the two or more other versions of code in the lineage of the progression candidate version of code at least in part by:

storing information identifying a path from the ancestor version of code to the progression candidate version of code;

determining that a first prior version of code was changed to a second prior version of code along the path;

identifying a particular difference between the first prior version of code and the second prior version of code.

19. The system of claim 16, wherein the set of actions further includes:

identifying the progressed version of code that addresses the documented security issue in response to receiving the input request;

adding, to a set of security issues for the progression candidate version of code, the indication that the progression candidate version of code is associated with the documented security issue; wherein one or more other security issues of the set of security issues is based at least in part on a static code analysis of the progression candidate version of code, wherein the static code analysis identifies a vulnerability in how the progression candidate version of code is written without using any documented security issues for a same code family as the progression candidate version of code; and reporting the set of security issues in response to the input request.

20. The system of claim 16, wherein the set of actions further includes:

parsing a site where information is posted about security issues relating to code projects, the code projects including a particular project having a same code family as the progression candidate version of code;

based at least in part on the site, detecting an association between a proposed fix to the documented security issue and the progressed version of code.

* * * * *